(12) United States Patent
Michels et al.

(10) Patent No.: US 10,815,342 B2
(45) Date of Patent: Oct. 27, 2020

(54) PROCESS FOR PRODUCING A STABILIZER DISPERSION AND PROCESS FOR PRODUCING A THERMOPLASTIC COMPOSITION STABILIZED WITH THE STABILIZER DISPERSION

(71) Applicant: INEOS STYROLUTION GROUP GMBH, Frankfurt am Main (DE)

(72) Inventors: Gisbert Michels, Leverkusen (DE); Ulrich Jansen, Dormagen (DE); Frank Eisentraeger, Cologne (DE); Stefan Kaminsky, Dormagen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 6 days.

(21) Appl. No.: 16/307,339

(22) PCT Filed: Jun. 6, 2017

(86) PCT No.: PCT/EP2017/063652
§ 371 (c)(1),
(2) Date: Dec. 5, 2018

(87) PCT Pub. No.: WO2017/211783
PCT Pub. Date: Dec. 14, 2017

(65) Prior Publication Data
US 2019/0135990 A1    May 9, 2019

(30) Foreign Application Priority Data

Jun. 6, 2016 (EP) .................................... 16173098

(51) Int. Cl.
| | | |
|---|---|---|
| *C08L 25/12* | (2006.01) | |
| *C08J 3/215* | (2006.01) | |
| *C08K 5/13* | (2006.01) | |
| *C08K 5/372* | (2006.01) | |
| *C08L 55/02* | (2006.01) | |
| *C08L 83/04* | (2006.01) | |
| *C08F 279/04* | (2006.01) | |
| *C08J 3/00* | (2006.01) | |
| *C08K 5/00* | (2006.01) | |
| *C08F 2/22* | (2006.01) | |

(52) U.S. Cl.
CPC ............. *C08J 3/215* (2013.01); *C08F 279/04* (2013.01); *C08J 3/005* (2013.01); *C08K 5/005* (2013.01); *C08K 5/13* (2013.01); *C08K 5/372* (2013.01); *C08L 25/12* (2013.01); *C08L 55/02* (2013.01); *C08L 83/04* (2013.01); *C08F 2/22* (2013.01); *C08F 2800/20* (2013.01); *C08J 2325/12* (2013.01); *C08J 2355/02* (2013.01); *C08J 2455/02* (2013.01); *C08J 2483/04* (2013.01)

(58) Field of Classification Search
CPC .......... C08J 3/215; C08J 3/005; C08K 5/055; C08K 5/13; C08K 5/372; C08F 279/04; C08F 2/22; C08L 55/02; C08L 25/12; C08L 83/04
USPC ....................................................... 523/334
See application file for complete search history.

(56) References Cited

U.S. PATENT DOCUMENTS

| | | |
|---|---|---|
| 4,156,069 A | 5/1979 | Prevorsek et al. |
| 4,224,419 A | 9/1980 | Swoboda et al. |
| 4,269,749 A | 5/1981 | Marriott et al. |
| 4,311,823 A | 1/1982 | Imai et al. |
| 4,982,014 A | 1/1991 | Freitag et al. |
| 5,196,142 A | 3/1993 | Mollet et al. |
| 5,883,189 A | 3/1999 | Eichenauer et al. |
| 6,187,825 B1 | 2/2001 | Guntherberg et al. |
| 6,525,172 B1 | 2/2003 | Barghoorn et al. |
| 6,833,041 B1 | 12/2004 | Meyer-Roscher et al. |
| 2003/0092836 A1 | 5/2003 | Eichenauer et al. |
| 2003/0173544 A1 | 9/2003 | Eichenauer |
| 2003/0181583 A1 | 9/2003 | Duijzings et al. |
| 2010/0216905 A1* | 8/2010 | Kuwamura ............ B29C 41/18 521/170 |
| 2010/0292385 A1 | 11/2010 | Fischer et al. |
| 2016/0075813 A1 | 3/2016 | Niessner et al. |
| 2016/0083572 A1 | 3/2016 | Niessner et al. |

FOREIGN PATENT DOCUMENTS

| | | |
|---|---|---|
| CA | 2143168 A1 | 8/1995 |
| DE | 2714544 A1 | 10/1977 |
| DE | 2826925 A1 | 1/1980 |
| DE | 3000610 A1 | 7/1980 |
| DE | 3832396 A1 | 2/1990 |
| DE | 19654169 A1 | 6/1998 |
| DE | 19907136 A1 | 8/2000 |
| DE | 19946519 A1 | 8/2001 |

(Continued)

OTHER PUBLICATIONS

English Translation of WO 2001023498 (Year: 2001).*

*Primary Examiner* — Hannah J Pak
(74) *Attorney, Agent, or Firm* — J.A. Lindeman & Co. PLLC

(57) ABSTRACT

The invention relates to a process for producing a stabilizer dispersion S, wherein the stabilizer dispersion is an aqueous composition comprising at least one phenolic stabilizer A, at least one thio co-stabilizer B, at least one surfactant C and at least one silicon oil component D. Further the present invention is directed to a process for producing a thermoplastic moulding composition, in particular an composition based on acrylonitrile butadiene styrene copolymers (ABS), using the stabilizer dispersion S.

10 Claims, 1 Drawing Sheet

(56) References Cited

FOREIGN PATENT DOCUMENTS

| | | | |
|---|---|---|---|
| DE | 10058135 | A1 | 5/2002 |
| DE | 102005022632 | A1 | 11/2006 |
| EP | 0022200 | A1 | 1/1981 |
| EP | 0669367 | A1 | 2/1995 |
| EP | 0845496 | A2 | 11/1997 |
| EP | 2949699 | A1 | 12/2015 |
| WO | 01/23489 | A1 | 4/2001 |
| WO | 01/23498 | A1 | 4/2001 |
| WO | 0123498 | A1 | 4/2001 |
| WO | 01/62848 | A1 | 9/2001 |
| WO | 02/10222 | A1 | 2/2002 |
| WO | 2008/020012 | A2 | 2/2008 |
| WO | 2009/071537 | A2 | 6/2009 |
| WO | 2014/170406 | A1 | 10/2014 |
| WO | 2014/170407 | A1 | 10/2014 |

\* cited by examiner

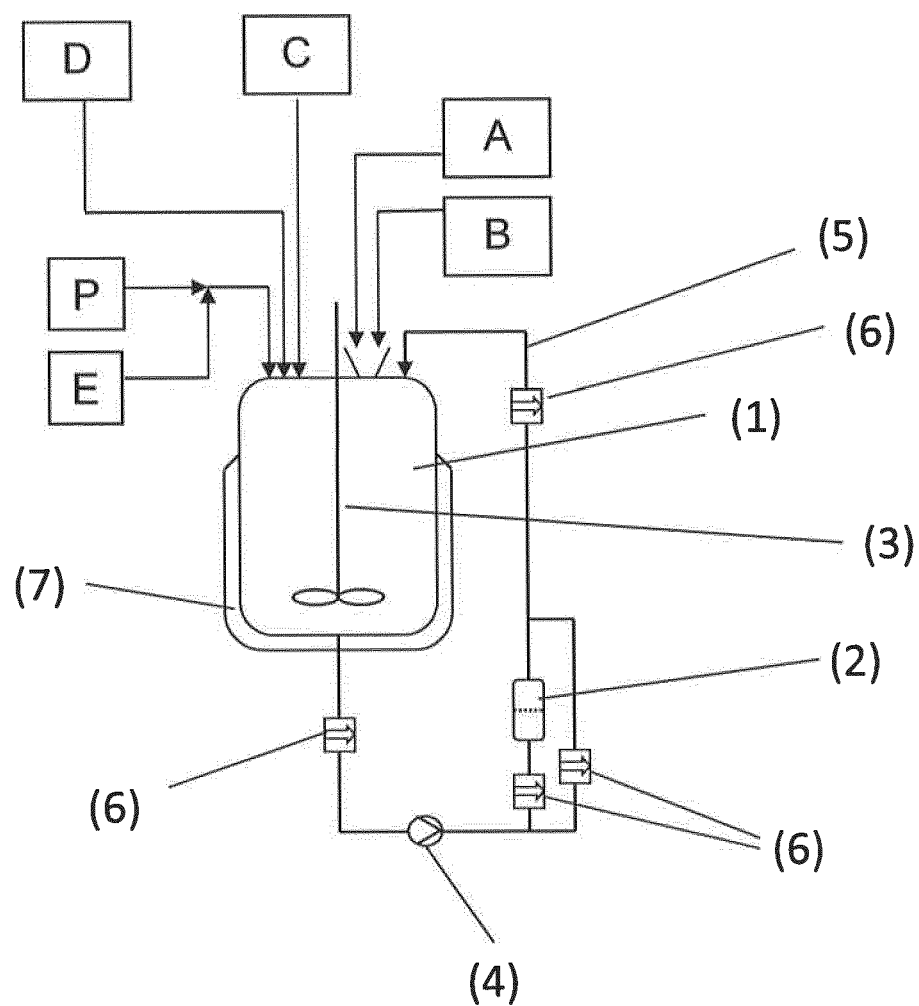

PROCESS FOR PRODUCING A STABILIZER DISPERSION AND PROCESS FOR PRODUCING A THERMOPLASTIC COMPOSITION STABILIZED WITH THE STABILIZER DISPERSION

The present invention relates to a process for producing a stabilizer dispersion S, wherein the stabilizer dispersion is an aqueous composition comprising at least one phenolic stabilizer A, at least one thio co-stabilizer B, at least one surfactant C and at least one silicon oil component D. Further the present invention is directed to a process for producing a thermoplastic moulding composition, in particular a composition based on acrylonitrile butadiene styrene copolymers (ABS) using the stabilizer dispersion S.

Polymer dispersions, in particular so called emulsion rubbers or polymer latexes, which are obtained by emulsion polymerization are used for a very wide variety of applications, e.g. emulsion paints, paper coatings, leather finishing, textile finishing, raw materials for adhesives. Further it is well known to incorporate isolated solid emulsion graft rubbers into thermoplastic moulding compositions as impact modifiers.

It is known in the state of the art to incorporate emulsion graft rubbers, e.g. grafted polybutadiene rubbers, into styrene acrylonitrile copolymers (SAN) or into methyl styrene acrylonitrile copolymers in order to improve the impact strength of the thermoplastic composition. Such acrylonitrile butadiene styrene copolymers (ABS) and acrylonitrile butadiene methyl-styrene copolymers have been used for many years for the production of moulding for several application, e.g. for the automotive sector. Generally such SAN/ABS mouldings modified to impact strength can be produced by graft polymerization of styrene and acrylonitrile (SAN matrix) in the presence of a polybutadiene latex or by mixing of a polybutadiene latex grafted with styrene and acrylonitrile, which is prepared and isolated separately, and the thermoplastic SAN matrix.

Beside the particular advantageous mechanical properties of ABS compositions, such as high impact strength and notched impact strength, high elasticity, and good processability (melt flow index), the resistance against the influence of heat and UV deposition are of particular importance. For stabilization of ABS polymer compositions or other polymers produced by graft emulsion polymerization on polybutadiene latexes, it is often necessary to add stabilizers, in particular in form of dispersions, to prevent the polymers against oxidative decomposition, e.g. promoted by light, UV, heat stress.

For example, thermoplastic ABS compositions and stabilized ABS compositions and their preparation are described in WO 2001/62848, WO 2008/020012 and WO 2009/071537.

Usually such stabilizer dispersions comprise phenolic antioxidants in order to stabilize the polymer with respect to oxidative phenomena. Often the phenolic antioxidants are used in combination with co-stabilizers, such as organic sulfur compounds (organosulfur compounds) or organic phosphor compounds (organophosphorus compounds). It is also common to use further additive, such as light stabilizers, antistatic agents and further usual additives in the production of the stabilizer dispersion and/or of the thermoplastic compositions. In particular silicon oils, such as polydimethylsiloxane, are used as additive in ABS compositions in particular to improve the resistance against chemical compounds and to improve the impact strength.

Normally, dispersions are systems consisting of at least one inner phase (also called disperse phase), which is homogenously and finely distributed in the so-called outer or continuous phase. Normally, dispersions are prepared by introducing the required dispersion energy into the system, e.g. by mechanical energy. As a rule, in common dispersions, so called macro dispersions, the mean size of the disperse phase particles is in the range of 100 nm and 1 mm. Macroemulsions are thermodynamically unstable and often separate within a certain time depending on conditions, such as stabilization, temperature, and pH value. Several methods and devices for the preparation of dispersions are known by a skilled person. Surface-active substances, so-called surfactants or dispersing agents, which facilitate the formation of the disperse phase particles (e.g. droplets or solid particles) and counteract phase separation, are normally important components of the dispersion.

Aqueous stabilizer dispersion for stabilizing ABS compositions against heat and UV decomposition, which comprises a phenolic stabilizer and a co-stabilizer, such as organic sulfur compounds (organosulfur compounds) or organic phosphor compounds, often have to be prepared using expensive multistage processes in order to ensure homogeneous distribution of the components.

DE-A 19946519 discloses a continuous process for the production of stabilizer dispersions or emulsions containing phenolic antioxidants and/or sulfur or phosphor containing co-stabilizer, e.g. didodecyl-3,3'-dithiopropionate. According to DE 19946519 the components are added to the aqueous phase and homogenized in a rotor-stator element, preferably the stabilizer components are homogenized in two or more steps. DE 19946519 does not disclose what particles size and particles size distribution are achieved by using the disclosed procedure. Further, it is not described in DE 19946519 how to produce an ABS composition comprising the stabilizer, co-stabilizer and silicon oil.

There is a need for a simple, inexpensive and versatile process, for producing stabilizer dispersion and for an improved method in order to incorporate such stabilizer dispersion into an ABS moulding composition. Further a target of the present invention is to provide ABS graft copolymers and compositions thereof with improved stability and good mechanical properties, which are stabilized with said improved stabilizer dispersion containing phenolic antioxidants, thio co-stabilizer and further components.

It has surprisingly been found that improved stabilizer dispersions can be obtained when the components are added in a specific range and at selected temperature. Further, the homogenization step has been improved to obtain the dispersion with an homogenous distributed disperse phase. Further, it has been found that such stabilizer dispersion for the stabilization of ABS moulding compositions can be optimized by incorporation of at least one silicon oil component into the stabilizer dispersion.

The present invention is directed to a process for producing a stabilizer dispersion S comprising
  a) at least one phenolic stabilizer A;
  b) at least one thio co-stabilizer B;
  c) at least one surfactant C;
  d) at least one silicon oil component D;
  e) optional at least one further component E; and
  f) an aqueous phase P comprising at least 80% by weight, based on the total aqueous phase P, water;

wherein the process comprises the following steps:
  i) providing an aqueous composition comprising the aqueous phase P;
  ii) adding the at least one thio co-stabilizer B to the aqueous composition obtained in step i), wherein the temperature of the aqueous composition is higher than or equal to the melting point of the at least one thio co-stabilizer B;
  iii) adding the at least one phenolic stabilizer A to the aqueous composition obtained in step ii), wherein the temperature of the aqueous composition is higher than or equal to the melting point of the at least one thio co-stabilizer B;
  iv) adding at least one surfactant C;
  v) adding at least one silicon oil component D and optionally at least one further component E;
  vi) homogenization of the aqueous composition obtained in steps i) to v) wherein the aqueous composition is passed at least once through at least one homogenization device, preferably at least once through at least one homogenization nozzle, wherein the stabilizer dispersion S, consisting of an continuous phase and at least one disperse phase, is obtained.

Further, the invention is directed to a process for producing a thermoplastic moulding composition based on acrylonitrile butadiene styrene copolymers (ABS), wherein the stabilizer dispersion S is added to the ABS graft rubber after its emulsion polymerization.

The stabilizer dispersion obtained by the inventive process exhibit excellent stability against aggregation and sedimentation. The stabilizer dispersion obtained by the inventive process can be characterized by small and homogenous distributed particles of the disperse phase. In particular the weight median particle size $D_{50}$ of the disperse phase of the stabilizer dispersions obtained by the inventive process, i.e. in step vi), may be below 3 μm, preferably below 2 μm and most preferably below 1.5 μm. Further it is possible to obtain an improved stabilizer dispersion already comprising the silicon oil component D. When such dispersions are used in the preparation of ABS copolymers, it is not necessary to add any additional silicon oil later in the producing process, so that further compounding steps for the addition of additives are reduced or even not necessary at all in the inventive process for producing a thermoplastic moulding composition.

The heat and UV resistance of the ABS thermoplastic moulding compositions and mouldings containing said stabilizer dispersions are significantly improved in comparison to ABS compositions, in which the stabilizer dispersion and the silicon oil are added separately. The mechanical properties of moulding compositions and mouldings, especially impact strength, are maintained or improved The thermoplastic moulding compositions based on acrylonitrile butadiene styrene copolymers (ABS) obtained by the inventive process and moulded parts thereof exhibit improved heat stability and resistance against oxidative decomposition. The mechanical properties of the thermoplastic moulding composition and the moulded parts are also improved or at least remain unchanged. Especially impact strength and melt flow of the thermoplastic moulding composition and the moulded parts according to the invention are improved compared to moulding compositions stabilized with stabilizer dispersion according to the state of the art.

In terms of the present invention, a dispersion means a system consisting of at least two phases, wherein the so-called inner or disperse phase is finely and homogenously distributed in the so-called outer or continuous phase. Typically the at least two phases of a dispersion are in the liquid or solid state. In particular the stabilizer dispersions S described in the present invention may be emulsions, suspensions or suspoemulsions.

According to the present invention the term emulsion is used to refer to a system of at least two liquid phases which are not homogeneously miscible with one another and wherein the disperse phase is present distributed in the form of small droplets in the second continuous phase. For example an oil-in-water emulsion (O/W emulsion) is an emulsion, in which droplets of the nonpolar phase (for example oil droplets) are present in the continuous polar phase (for example water phase). Correspondingly a water-in-oil emulsion (W/O emulsion), which are also called inverse emulsions, is an emulsion, in which droplets of the polar phase (for example water droplets) are present in the continuous nonpolar phase (for example oil phase).

According to the present invention, the term suspensions is used to refer to a system of at least one disperse solid phase in at least one continuous liquid phases wherein the disperse solid phase is present distributed in the form of small solid particles in the liquid continuous phase.

According to the present invention the term suspoemulsion is used to refer to a system of at least one solid disperse phase, at least one liquid disperse phase and at least one liquid continuous phase. For example it might be possible that the disperse liquid phase is distributed in the form of small droplets in the continuous liquid phase and the disperse solid phase is present in form of small solid particles contained in the droplets of the liquid disperse phase. For example it might be possible that the at least one disperse liquid phase is present in the form of small droplets distributed in the continuous liquid phase and the at least one solid disperse phase is present in form of small solid particles distributed in the continuous liquid phase.

Typically in a macrodispersion (e.g. macro-emulsion or macro-suspoemulsion) the at least one disperse phase is finely distributed in the continuous phase, wherein normally the average size of the particles (e.g. droplets) of the disperse phase is in the range of 100 nm to 1 mm, preferably 100 to 100,000 nm, more preferably 100 to 10,000 nm, most preferably 500 to 3,000 nm. In particular the stabilizer dispersion S may be referred to as a macrodispersion.

In particular the present invention is directed to a process for producing an aqueous stabilizer dispersion S comprising an aqueous continuous phase P. In particular the stabilizer dispersion S, consisting of at least one disperse phase and the aqueous phase P as continuous phase, wherein the aqueous phase P comprising at least 80% by weight, preferably at least 90% by weight, more preferably at least 99% by weight, based on the total aqueous phase P, water, and the disperse phase comprises the stabilizers A and B described in the following. Preferably the disperse phase comprises or is mainly composed of the stabilizers A and B and the silicon oil component D wherein the stabilizers A and B and the silicon oil component D may each be in the solid and/or fluid state.

The components used for the preparation of the stabilizer dispersion S may be solid or liquid at room temperature. The preparation process for the stabilizer dispersions can be adapted to the consistency of the starting materials.

Phenolic Stabilizer A

The at least one phenolic stabilizer A used in the process of the present invention is preferably selected from phenolic antioxidants. In terms of the present invention phenolic antioxidant is an organic compound comprising at least one phenolic structure element

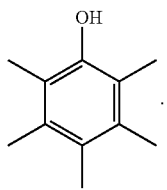

The at least one phenolic stabilizer A is preferably used in an amount from 0.1 to 65% by weight, preferably 1 to 60% by weight, particularly preferably from 10 to 30% by weight, most preferably from 15 to 30% by weight, based on the total weight of the stabilizer dispersion S.

Suitable phenolic stabilizers A may be solid or liquid at room temperature. The process of the invention also permits in particular the use of antioxidants whose melting point is above 100° C. Preferably the phenolic stabilizer A exhibit a melting point below 150° C., preferably below 140° C., more preferably below 120° C. Preferably the phenolic stabilizer S exhibit a melting point in the range from 80 to 150° C., preferably from 90 to 140° C., more preferably from 100 to 120° C.

Suitable phenolic stabilizers A and methods for their preparation are for example described in DE-A 199 45 519, EP-A 0 669 367, U.S. Pat. No. 5,196,142, and in the book "Die Stabilisierung der Kunststoffe gegen Licht und Wärme" by J. Voigt, Springer Verlag Berlin-Heidelberg-New York, 1966.

Preferably the at least one phenolic stabilizer A is selected from compounds according to formulas (I) or (II) described in the following:

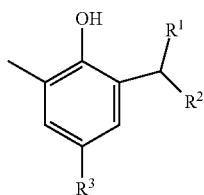

(I)

with
$R^1$ is $C_1$-$C_6$-alkyl, preferably methyl or ethyl;
$R^2$ is $C_2$-$C_{30}$-alkyl, and
$R^3$ is $C_1$-$C_4$-alkyl;

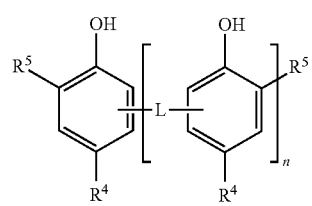

(II)

with
$R^4$ is independently from each other $C_1$-$C_6$-alkyl;
$R^5$ is independently from each other $C_1$-$C_6$-alkyl, or cyclohexyl;
L is $C_1$-$C_6$-alkylen, preferably —$CH_2$—, or a linking group tricyclo[5.2.1.0$^{2,6}$]decan of formula

more preferably tricyclo[5.2.1.0$^{2,6}$]decan-3-3-ylen;
and n is 1 to 10, preferably 1 to 5, more preferably 1 to 3.

Compounds of formula (I) are preferred wherein
$R^1$ is methyl or ethyl;
$R^2$ is $C_2$-$C_{30}$-alkyl, preferably $C_9$-$C_{20}$-alkyl, more preferably $C_{12}$-$C_{18}$-alkyl
$R^3$ is methyl or ethyl.

Compounds of formula (II) are preferred wherein
$R^4$ is independently from each other $C_1$-$C_4$-alkyl, more preferably methyl or ethyl;
$R^5$ is independently from each other $C_1$-$C_4$-alkyl or cyclohexyl, more preferably methyl, ethyl, propyl, iso-propyl, sec-butyl or tert-butyl,
L is —$CH_2$—, or tricyclo[5.2.1.0$^{2,6}$]decan-3-3-ylen and n is 1 to 5, more preferably 1 to 3, more preferably 1.

In a more preferred embodiment the at least one phenolic stabilizer A is a compound of formula (IIa) or (IIb):

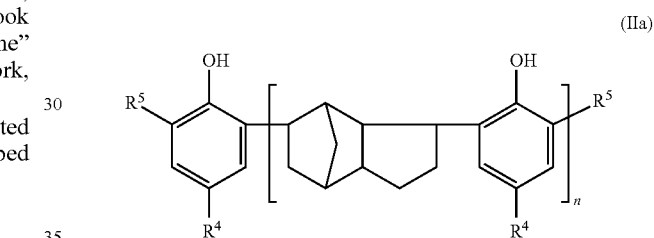

(IIa)

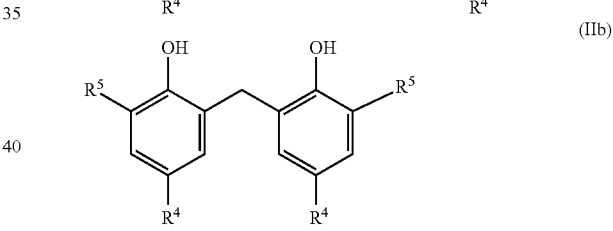

(IIb)

wherein the radicals $R^4$ and $R^5$ and the index n are as defined above.

The compounds of the formulas (I), (II), (IIa) and (IIb) may also be present as a mixture of individual compounds.

In a preferred embodiment the at least at least one phenolic stabilizer A is a compound according to formula (IIc)

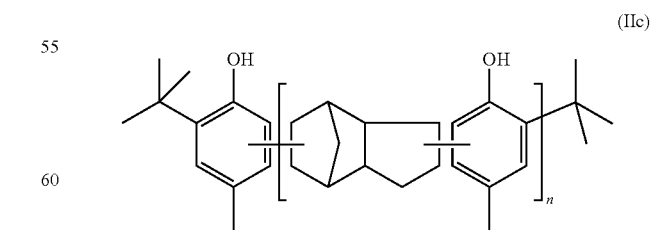

(IIc)

with n=1-5, preferably 1-3

In a preferred embodiment the at least at least one phenolic stabilizer A is a butylated reaction product of p-cresol and dicyclopentadiene according to formula (IId):

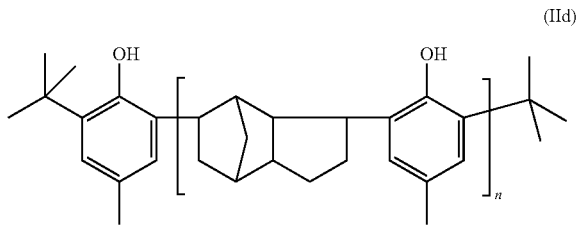

with n=1-5, preferably 1-3, more preferably 1.

In a preferred embodiment the butylated reaction product of p-cresol and dicyclopentadiene used as phenolic stabilizer A has an average molecular weight in the range of 600-700 g/mol.

In a preferred embodiment the phenolic stabilizer A consist of one or more of above mentioned compounds of Formula (IIc) or (IId) alone or in combination with other phenolic stabilizers.

For example a commercial available butylated reaction product of p-cresol and dicyclopentadiene (CAS Reg. No. 68610-51-5), which can preferably be used as phenolic stabilizer A, is Wingstay® L (from Omnova Solutions Inc., Fairlawn, Ohio, USA); Ionol® LC (from Raschig GmbH, Ludwigshafen, Germany) or Lowinox® CPL (from Addivant, Middlebury, USA).

In a preferred embodiment the at least phenolic stabilizer A is selected from the group consisting of octadecyl-3-(3, 5-bis(1,1-dimethylethyl)-4-hydroxyphenyl)propionate; a butylated reaction product of p-cresol and dicyclopentadiene according to formula (IId)

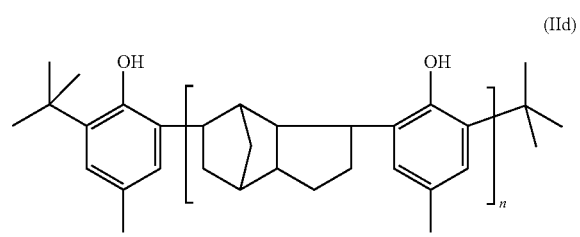

with n=1-3; 1,1,3-tris(2'-methyl-4'-hydroxy-5'-tert-butylphenyl)butane; 2,2'-methylenebis(6-(1,1-dimethylethyl)-4-methyl-phenol); 4,4'-thiobis(3-methyl-6-tert-butylphenol);
and compounds of the formula (I)

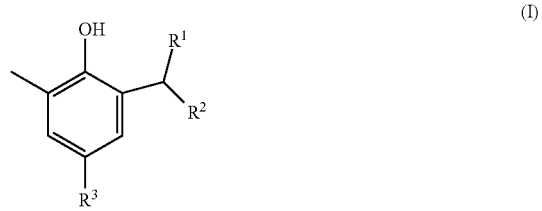

wherein $R^1$ is methyl or ethyl, $R^2$ is $C_2$-$C_{20}$-alkyl, and $R^3$ is $C_1$-$C_4$-alkyl.

The stabilizer dispersion S of the invention may also comprises other conventional antioxidants beside compounds of formulas (I) and (II) as phenolic stabilizers A. For example such further antioxidants are alkylated monophenols; alkylthiomethylphenols; hydroquinones and alkylated hydroquinones; hydroxylated diphenyl thioethers; and alkylidenebisphenols. Such antioxidants are for example described in WO 01/23498.

Preferably the phenolic stabilizers A is at least one compound selected from 2,6-di-tert-butyl-4-methylphenol (CAS 128-37-0); octyl-3,5-di-tert-butyl-4-hydroxy-hydrocinnamate (CAS 12643-61-0), hexamethylene bis[3-(3,5-di-tert-butyl-4-hydroxyphenyl)propionate] (CAS 35074-77-2), N,N'-1,6-hexanediylbis{3-[4-hydroxy-3,5-bis(2-methyl-2-propanyl)phenyl]propanamide} (CAS 23128-74-7), triethylene glycol bis(3-tert-butyl-4-hydroxy-5-methylphenyl) propionate (CAS 36443-68-2); 2-tert-butyl-4-[1-(5-tert-butyl-4-hydroxy-2-methylphenyl)butyl]-5-methylphenol (CAS 85-60-9); benzenepropanoic acid; 3-(1,1-dimethylethyl)-4-hydroxy-5-methyl-, 1,1'-(2,4,8,10-tetraoxaspiro (5.5)undecane-3,9-diylbis(2,2-dimethyl-2,1-ethanediyl)) ester (CAS 90498-90-1); 1,3,5-trimethyl-2,4,6-tris(3,5-di-tert-butyl-4-hydroxybenzyl)benzene (CAS 1709-70-2); 3-({3-[4-Hydroxy-3,5-bis(2-methyl-2-propanyl)phenyl] propanoyl}oxy)-2,2-bis[({3-[4-hydroxy-3,5-bis(2-methyl-2-propanyl)phenyl]propanoyl}oxy)methyl]propyl 3-[4-hydroxy-3,5-bis(2-methyl-2-propanyl)phenyl]propanoate (CAS 6683-19-8); ethylene bis[3,3-bis(3-tert-butyl-4-hydroxyphenyl)butyrate] (CAS 32509-66-3); 2,4-dimethyl-6-(1-methylpentadecyl)-phenol (CAS 134701-20-5); octadecyl 3-(3,5-bis(1,1-dimethylethyl)-4-hydroxyphenyl) propionate (CAS2082-79-3); a butylated reaction product of p-cresol and dicyclopentadiene as described above; 1,1,3-tris(2'-methyl-4'-hydroxy-5'-tert-butylphenyl)butane (CAS 1843-03-4); 2,2'-methylenebis(6-(1,1-dimethylethyl)-4-methyl-phenol (CAS119-47-1); and 4,4'-thiobis(3-methyl-6-tert-butylphenol) (CAS 96-66-2).

Particularly preferred the phenolic stabilizers A is at least one compound selected from octadecyl-3-(3,5-bis(1,1-dimethylethyl)-4-hydroxyphenyl)propionate, a butylated reaction product of p-cresol and dicyclopentadiene as described above, 1,1,3-tris(2'-methyl-4'-hydroxy-5'-tert-butylphenyl) butane, 2,2'-methylenebis(6-(1,1-dimethylethyl)-4-methylphenol, and 4,4'-thio-bis(3-methyl-6-tert-butylphenol).

The preferred phenolic stabilizers described above may be used individually or in a mixture made from various antioxidants.

Thio Co-Stabilizer B

In terms of the present invention the at least one thio co-stabilizer B is an organic sulfur containing compound (organosulfur compound). In terms of the present invention an organic sulfur containing compound is an organic compound comprising at least one sulfur containing group, wherein the sulfur containing group is particularly selected from sulfides, sulfites, and sulfates, preferably the sulfur containing group is at least one sulfide group, which may be a thioether group of formula R—S—R or thiol group of formula R—SH.

The at least one thio co-stabilizer B is preferably used in an amount from 0.1 to 65% by weight, preferably 1 to 60% by weight, particularly preferably from 10 to 40% by weight, most preferably from 20 to 40% by weight, based on the total weight of the stabilizer dispersion S.

Suitable thio co-stabilizer B may be solid or liquid at room temperature. Preferably the thio co-stabilizer B exhibit a melting point below 100° C., preferably below 60° C., more preferably below 40° C.

Preferred the at least one thio co-stabilizer B is selected from at least one sulfide according to formula (III)

$$R'—CH_2—S—CH_2—R \quad \text{(III)}$$

wherein
R and R', independently of one another, are an alkyl group having from 1 to 20 carbon atoms or an alkyl alkanoate of the formula (IV):

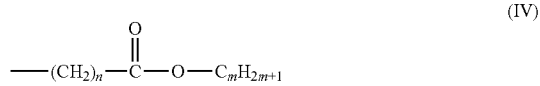

(IV)

with n=0, 1 or 2 and m=1-20

In a preferred embodiment the at least one thio co-stabilizer B is a compound of formula (III), wherein R and R', independently of one another, are
an alkyl group having from 1 to 11, preferably from 7 to 11, carbon atoms,
or a group

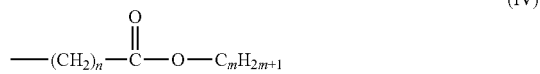

(IV)

wherein m is from 12 to 18 and n=1 or 2.

In a preferred embodiment the at least one thio co-stabilizer B is a compound of formula (III) wherein the radicals R and R' are the same.

In a preferred embodiment the at least one thio co-stabilizer B is a sulfide compound selected from the group consisting of dilauryl thiodipropionate (didodecyl thiodipropionate), pentaerythritol tetrakis(octyl thiodipropionate), distearyl thiodipropionate (dioctadecyl thiodipropionate), dimyristyl thiodipropionate, pentaerythritol tetrakis(β-lauryl thiodipropionate), 2,4-bis(n-octylthio)-6-(4'-hydroxy-3',5'-di-tert-butylanilino)-1,3,5-triazine, trimethylolpropane tris(octyl thiodipropionate), trimethylolethane tris(octyl thiodipropionate), ethylene glycol bis(lauryl thiodipropionate), and didodecyl monosulfide.

Very particular preference is given to didodecyl-3,3'-dithiopropionate (dilauryl-3,3'-thiodipropionate) and dioctadecyl-3,3'-thiodipropionate (distearyl-3,3'-thiodipropionate).

In particular a suitable thio co-stabilizer B is the commercial available product Irganox® PS 800 (from BASF SE, Ludwigshafen, Germany, which is didodecyl-3,3'-dithiopropionate, CAS Reg. No. 123-28-4).

In a preferred embodiment the at least phenolic stabilizer A is a butylated reaction product of p-cresol and dicyclopentadiene as described above and the at least one thio co-stabilizer B is didodecyl-3,3'-dithiopropionate.

Surfactant C

In terms of the present invention a surfactant is a compound reducing the surface tension of the aqueous phase and/or a protective colloids that helps to stabilize a dispersion, in particular a suspension, an emulsion or a suspoemulsion against sedimentation.

The at least one surfactant C is preferably used in an amount from 0.1 to 20% by weight, preferably 0.5 to 15% by weight, particularly preferably from 1 to 10% by weight, most preferably from 1 to 5% by weight, based on the total weight of the stabilizer dispersion S.

Suitable surfactants C are surface-active agents or protective colloids commonly known for the preparation of emulsions and suspensions, in particular of aqueous emulsions and suspensions. Mixtures of surface active agents and/or protective colloids may also be used.

Examples of suitable protective colloids are polyvinyl alcohols, cellulose derivatives, and copolymers containing vinylpyrrolidone. A detailed description of other suitable protective colloids is found in Houben-Weyl, Methoden der organischen Chemie, Vol. XIV/1, Makromolekulare Stoffe, Georg-Thieme-Verlag, Stuttgart, 1961, pp. 411-420.

The surface active agents used as surfactant C are preferably exclusively compounds, which, unlike the protective colloids, usually have relative molecular weights below 2,000 g/mol. They may be either anionic, cationic, or non-ionic in nature. When mixtures of surface-active agents are used, the individual components have to be mutually compatible, and in the case of doubt, this can be checked using a few preliminary experiments. Examples of suitable surface active agents are ethoxylated mono-, di-, and tri-alkylphenols having from 4 to 9 carbon atoms in the alkyl radical and an degree of ethoxylation (EO index) from 3 to 50, ethoxylated fatty alcohols having from 8 to 36 carbon atoms in the alkyl radical and an EO index from 3 to 50, fatty alcohol sulfonates, sulfosuccinates, ether sulfonates, resin soaps, and also the alkali metal or ammonium salts of alkylsulfonates having from 8 to 12 carbon atoms in the alkyl radical, and salts of higher fatty acids having from 10 to 30 carbon atoms in the alkyl radical. Other suitable emulsifiers are found in Houben-Weyl, Methoden der organischen Chemie, Vol. XIV/1, Makromolekulare Stoffe, Georg-Thieme-Verlag, Stuttgart, 1961, pp. 192-206.

Other suitable anionic surface active agents are bis(phenylsulfonic acid) ethers and their alkali metal or ammonium salts, where these bear a $C_4$-$C_{24}$-alkyl group on one or both aromatic rings. These compounds are disclosed by way of example in U.S. Pat. No. 4,269,749.

Preferably the at least one surfactant C is a compound selected from sodium or potassium salts of arylalkyl- or alkylsulfonates or of fatty acids having from 10 to 18 carbon atoms.

In a preferred embodiment the surfactant C is selected alkylsulfonates, arylalkylsulfonates, fatty acids, and sodium and potassium salts thereof. More preferable the at least on surfactant C is selected from fatty acids, in particular fatty acids having a aliphatic hydrocarbon chain of 10 to 30, preferably 10 to 18, carbon atoms and sodium and potassium salts thereof. More preferably the surfactant C is at least one fatty acid selected from oleic acid, stearic acid, palmitic acid and sodium and potassium salts thereof. In a preferred embodiment the surfactant C is selected from sodium and potassium salts of alkylsulfonates, arylalkylsulfonates, fatty acids, and salts of fatty acids, in particular sodium and potassium salts of fatty acids, in particular long-chain fatty acids having a aliphatic hydrocarbon chain of 10 to 30, preferably 10 to 18, carbon atoms and sodium and potassium salts thereof, more preferably selected from oleic acid, stearic acid, palmitic acid and sodium and potassium salts thereof.

In another preferred embodiment, the surfactant C or the active form of the surfactant C is prepared in situ from an alkylsulfonate, arylalkylsulfonate or a fatty acid with an alkali metal hydroxide by conversion into the corresponding salt, which is active as surfactant in the dispersion. Instead of alkali metal hydroxides, it is also possible to use alkali metal carbonates or alkali metal hydrogen carbonates. Preferably the at least one surfactant C is at least one fatty acid, preferably selected from oleic acid, stearic acid and palmitic acid, which is converted into the corresponding sodium or potassium salt.

Silicon Oil Component D

In terms of the present invention a silicon oil refers to a polymerized siloxane having organic side chains which can in particular described by the formula $[R^a R_b SiO]_o$ with $R^a$ and $R^b$ are organic radicals, such as alkyl radicals. Preferably the silicon oil component is selected from polydimethylsiloxanes which may be linear or branched. The at least one silicon oil component D is preferably used in an amount from 0.1 to 40% by weight, preferably from 0.5 to 30% by weight, particularly preferably from 1 to 10% by weight, most preferably from 2 to 8% by weight, based on the total weight of the stabilizer dispersion S.

In a preferred embodiment the silicon oil component D is polydimethylsiloxane of the following general formula (V):

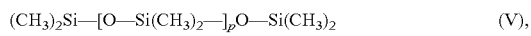

$(CH_3)_2Si$—$[O$—$Si(CH_3)_2$—$]_p O$—$Si(CH_3)_2$     (V), with p=integer number >1, preferably p=1 to 5,000.

Preferably the kinematic viscosity of the silicon oil component D is the range of 100 mm²/s to 1,000,000 mm²/s, preferably in the range of 500 to 100,000 mm²/s.

Preferably the silicon oil component used in the inventive process is a polydimethylsiloxane, CAS Reg. No. 63148-62-9, characterized by a kinematic viscosity of with a kinematic viscosity of 1,000 to 60,000 mm²/s.

For example a suitable silicon oil component C used in the inventive process is one or more of the commercial available products Wacker Silcone Fluids AK 1000 (having a kinematic viscosity of 1;000 mm²/s), Wacker Silcone Fluids AK 30,000 (having a kinematic viscosity of 30,000 mm²/s) and Wacker Silcone Fluids AK 60,000 (having a kinematic viscosity of 60,000 mm²/s).

Further Component(s) E

Besides components A to D, the stabilizer dispersions S may comprise other auxiliaries and additives as further optional component E.

The optional further at least one further component E is preferably used in an amount from 0 to 30% by weight, preferably from 0.01 to 20% by weight, particularly preferably from 0.5 to 10% by weight, most preferably from 0.1 to 1.5% by weight, based on the total weight of the stabilizer dispersion S.

The auxiliaries and additives may either be suitable for facilitating the preparation of the dispersion and improving its stability (soaps, protective colloids, Pickering emulsifiers, bactericides, fungicides, etc.) or else for improving the properties of the products to be stabilized, for example light stabilizers, for example selected from the group consisting of the hindered amines (HALS stabilizers), or antistatic components, for example block copolymers made from ethylene oxide-propylene oxide (e.g. products Pluronics® of BASF SE).

It is possible to add one or more auxiliaries and additives selected from UV absorbers, light stabilizers, dyes, bactericides, fungicides, lubricants, plasticizers, pigments, optical brighteners, flame retardant agents, antistatic agents, blowing agents and fillers as further components E. Preferred further components E are alkaline compounds in particular selected from alkali metal hydroxides, alkali metal carbonates and alkali metal hydrogen carbonates to neutralize fatty acids used as surfactant C. In particular caustic soda (sodium hydroxide) is added as further component E. In particular the alkaline compound is added in an amount sufficient to neutralize one or more of the fatty acids used as surfactant C.

In a preferred embodiment the stabilizer dispersion S comprises 0.01 to 10% by weight, preferably from 0.1 to 5% by weight, particularly preferably from 0.5 to 2% by weight, most preferably from 0.1 to 1.5% by weight, based on the total weight of the stabilizer dispersion S, at least one alkaline compound, selected from alkali metal hydroxides, alkali metal carbonates and alkali metal hydrogen carbonates, as further component E.

Aqueous Phase P

The stabilizer dispersion S, which is produced by the inventive process, comprises an aqueous phase P comprising at least 80% by weight, preferably at least 90% by weight, based on the total aqueous phase P, water, preferably deionized water.

Preferably the stabilizer dispersion S comprises 80 to 99.99% by weight, preferably from 90 to 98% by weight water. In a preferred embodiment the aqueous phase P comprises 80 to 100% by weight, preferably about 100% by weight, water.

The aqueous phase P may comprise one or more with water miscible organic polar solvents such as water-miscible alcohols, ethers, esters and ketones.

In particular some components of the stabilizer dispersion, in particular the at least one surfactant C, alkaline compounds or other further components E, e.g. salts, may be present in dissolved form in the aqueous phase.

In particular the amount of the aqueous phase P in the stabilizer dispersion S is selected to make the total weight of the stabilizer dispersion 100% by weight. Typically, the aqueous phase P is present in an amount of at least 10% by weight, preferably at least 50% by weight, particularly preferred from 10 to 99.6% by weight, preferably from 20 to 90% by weight, particularly preferably from 30 to 80% by weight, based on the total weight of the stabilizer dispersion S.

In a preferred embodiment the invention is directed to the inventive process described above, wherein the aqueous stabilizer dispersion S comprises:

- 0.1 to 65% by weight, preferably 1 to 60% by weight, particularly preferably from 10 to 30% by weight, most preferably from 15 to 30% by weight, based on the total weight of the stabilizer dispersion S, of the at least one phenolic stabilizer A;
- 0.1 to 65% by weight, preferably 1 to 60% by weight, particularly preferably from 10 to 40% by weight, most preferably from 20 to 40% by weight, based on the total weight of the stabilizer dispersion S, of the at least one thio co-stabilizer B;
- 0.1 to 20% by weight, preferably 0.5 to 15% by weight, particularly preferably from 1 to 10% by weight, most preferably from 1 to 5% by weight, based on the total weight of the stabilizer dispersion S, of the at least one surfactant C,
- 0.1 to 40% by weight, preferably from 0.1 to 30% by weight, preferably from 0.5 to 30% by weight, particularly preferably from 0.5 to 10% by weight, particularly preferably from 1 to 10% by weight, most preferably from 2 to 8% by weight, based on the total weight of the stabilizer dispersion S, of the silicon oil D;
- 0 to 30% by weight, preferably from 0.01 to 20% by weight, particularly preferably from 0.5 to 10% by weight, most preferably from 0.1 to 1.5% by weight, based on the total weight of the stabilizer dispersion S, of at least one further component E; and
- an amount of the aqueous phase P to make the total weight of the stabilizer dispersion 100% by weight.

Steps of the Process for Producing a Stabilizer Dispersion S

According to the invention it is preferred to add the at least one phenolic stabilizer A to an aqueous dispersion comprising the at least one thio co-stabilizer in liquid (molten) state (steps i) to iii)). Thus, the temperature of the aqueous composition is typically higher than or equal to the melting point of the at least one thio co-stabilizer B. Preferably, the phenolic stabilizer A, that in most cases exhibits an melting point which is higher than the melting point of the thio co-stabilizer B, build an two component eutectic system together with the molten thio co-stabilizer B.

Preferably the aqueous composition obtained in steps i) to v) (pre-dispersion), comprising the aqueous phase P, the phenolic stabilizer/s A, the thio co-stabilizer/s B, the surfactant/s C and the silicon oil/s D, is prepared as described in the following and the homogenization of said aqueous composition (pre-dispersion) is carried out once or several times using one or more of the described homogenization devices.

The pre-dispersion comprising components A, B, C, D, P and optional E may prepared in a suitable separated mixing device, preferably arranged in series to the homogenization device. However, it is also possible for the mixing to be carried out in a unit located in the homogenization device. In particular the inventive process may be carried out in a stirred tank, in particular at least the pre-dispersion is prepared in a stirred tank (steps i to v).

The pre-dispersion comprising the components A, B, C, D, P and optional E afterwards pass the homogenization step. The homogenization of the pre-dispersion in step vi) can be carried out by commonly known homogenization devices, for example homogenization devices wherein the pre-dispersion is passed via a pipe through one or more homogenization nozzles or dispersing devices based on a rotor/stator principle (for example described in WO 01/23498 or DE-A 196 54 169). It can be sufficient here for the pre-dispersion to be passed through only one homogenization device or a number of homogenization devices which may be identical or differ from one another.

Typically the pre-dispersion is prepared with low or moderate energy input (e.g. using a stirrer) and the particles of the disperse phase of the pre-dispersion have typically a weight mean average particle size of more than 10 µm, for example in the range of 20 to 1,000 µm.

Preparation of the Pre-Dispersion in Steps i) to v)

The preparation of the pre-dispersion encompasses
i) providing an aqueous composition comprising the aqueous phase P and optionally the at least one surfactant C;
ii) adding the at least one thio co-stabilizer B to the aqueous composition obtained in step i), wherein the temperature of the aqueous composition is higher than or equal to the melting point of the at least one thio co-stabilizer B;
iii) adding the at least one phenolic stabilizer A to the aqueous composition obtained in step ii), wherein the temperature of the aqueous composition is higher than or equal to the melting point of the at least one thio co-stabilizer B;
iv) adding at least one surfactant C;
v) adding at least one silicon oil component D and optionally at least one further component E;

The temperature of the aqueous composition in at least the steps ii) and iii), preferably in the steps ii) to v), is higher than or equal to the melting point of the at least one thio co-stabilizer B.

Preferably the aqueous composition provided in step i) is adjusted to a temperature higher than or equal to the melting point of the at least one thio co-stabilizer B and said temperature is maintained during the steps ii) to v), preferably during the steps ii) to vi).

Preferably the steps i) to v), more preferably i) to vi), are carried out in a stirred tank, in particular in a stirred tank equipped with a by-pass including one or more homogenization nozzles as described below. The components A, B, C, D and optional E may be added as described via suitable dosage units.

Preferably the at least surfactant C is added during step i). In this embodiment the steps i) and iv) are carried out together, which means that the first step of the inventive process is steps i) and iv) providing an aqueous composition comprising the aqueous phase P and the at least one surfactant C.

However, it is possible to add the surfactant C before or during any other step i) to v) before the homogenization step vi). In a further preferred embodiment the inventive process encompasses the following steps:

steps i) and iv) providing an aqueous composition comprising the aqueous phase P and the at least one surfactant C selected from fatty acids, in particular fatty acids having a aliphatic hydrocarbon chain of 10 to 30, preferably 10 to 18, carbon atoms,
and
step v) adding at least one silicon oil component D and as component E at least one alkaline compound, in particular selected from alkali metal hydroxides, alkali metal carbonates and alkali metal hydrogen carbonates.

Preferably the silicon oil component D is added to the aqueous composition obtained in step iii). However, it is possible to add the silicon oil component D before or during any other step i) to v) before the homogenization step vi).

Typically the at least one further component E can be added to the aqueous composition obtained in step iii). However, it is also possible to add at least one further component E before or during any other steps i) to v), preferably before the homogenization step vi). More preferably the at least one further component E is added to the aqueous composition obtained in steps i) to iii), more preferably obtained in steps i) to iv), or also preferably directly before the homogenization step vi).

Typically the inventive process is carried out at a pressure in the range of 1 bar to 1000 bar, preferably 5 to 100 bar, more preferably 10 bar to 50 bar. Typically the preparation of the pre-dispersion is carried out under atmospheric pressure, in particular of about 1013 hPa.

In a preferred embodiment step i) is carried out at a temperature in the range of 50 to 100° C., preferably in the range of 60 to 90° C. Preferably the at least on surfactant C is added to the aqueous phase P under stirring, in particular in a stirred tank, in step i).

In a preferred embodiment the temperature of the aqueous composition in at least steps ii) and iii) is higher than or equal to the melting point of the at least one thio co-stabilizer B. More preferably the temperature of the aqueous composition in steps ii), and iii), preferably in the steps ii), iii) and v), more preferably in the steps ii), iii), iv) and v), is in the range of 50 to 100° C., preferably in the range of 60 to 85° C. In a further preferred embodiment the thio co-stabilizer B is selected from didodecyl-3,3'-dithiopropionate and/or dioctadecyl-3,3'-thiodipropionate, most preferably the thio co-stabilizer B is didodecyl-3,3'-dithiopropionate (e.g. Irganox® PS 800, BASF SE), and the temperature in at least the steps ii) and iii) is in the range of 50 to 95° C., preferably 60 to 90° C., most preferably 75 to 85° C.

The process according to any of claims 1 to 6, wherein.

More particular, the at least one thio co-stabilizer B is added in step ii) in solid form to the aqueous composition under stirring, in particular in a stirred tank. Preferably in step ii) the aqueous composition comprising the aqueous phase P, the surfactant C and the thio co-stabilizer B is maintained at a temperature in the range of 50 to 100° C., preferably in the range of 60 to 90° C., for at least 1 minute, preferably at least 10 min to ensure that the thio co-stabilizer B is in the molten form.

Preferably in step ii) the aqueous composition is maintained at a temperature in the range of 50 to 100° C., preferably in the range of 60 to 90° C., for 1 to 240 minutes, preferably for 10 to 90 minutes.

More particular, the at least one phenolic stabilizer A is added in step iii) in solid form to the aqueous composition obtained in step ii) under stirring, in particular in a stirred tank. In a preferred embodiment in step iii) the aqueous composition comprising the aqueous phase P, optional the surfactant C, the thio co-stabilizer B and the phenolic stabilizer A is maintained at a temperature in the range of 50 to 100° C., preferably in the range of 60 to 90° C., for at least 1 minute, preferably at least 10 min, to ensure that the thio co-stabilizer B and the phenolic stabilizer A build an two component eutectic system dispersed in the aqueous phase. More preferably in step iii) the aqueous composition is maintained at a temperature in the range of 50 to 100° C., preferably in the range of 60 to 90° C., for 1 to 240 minutes, preferably for 10 to 90 minutes.

In a preferred embodiment step v) is carried out at a temperature in the range of 50 to 100° C., preferably in the range of 60 to 90° C. Preferably the at least silicon oil D is added to the aqueous composition under stirring, in particular in a stirred tank.

The one or more disperse phases in the stabilizer dispersion S may be in liquid and/or solid state, in particular depending on the temperature. In a preferred embodiment, at room temperature the stabilizer dispersion S can be regarded as a dispersion of finely divided solid and/or liquid particles comprising the components A and B. The silicon oil component D may be at least partially incorporated onto or into the disperse phase particles and/or be present in liquid form as finely divided droplets.

In a preferred embodiment the solid content of the aqueous composition obtained in steps i) to v) (pre-dispersion used homogenization step vi) is in the range of 65 to 90% by weight, preferably in the range of 70 to 85% by weight, preferably in the range of 75 to 80% by weight, based on the total aqueous composition. It is preferred to use an aqueous composition obtained in steps i) to v) having said solid content in the homogenization step vi) in order to minimize the particle size of the disperse phase in the homogenization step vi) as much as possible.

In terms of the present invention the solid content refers to and is equal to the weight content of the non-volatile compounds in the aqueous composition or the stabilizer dispersion S. The solid content is in particular equal to the solid content determined gravimetrically by removing the volatile compounds, which are in particular the compounds of the aqueous phase P, for example by evaporation at 150 to 180° C. for about 10 to 120 min in a drying cabinet.

Typically the solid content is also a measure for the weight content of the disperse phase in the aqueous composition or the stabilizer dispersion S.

Preferably, the inventive process for the production of an stabilizer dispersion S comprises in the step v), adding at least one further component E, preferably at least one alkaline compound, more preferably caustic soda or caustic soda solution, to the aqueous composition obtained in step iii) or steps i) to iv). Preferably the alkaline compound is added in cases where a fatty acid is used as surfactant C in order to neutralize the fatty acid and to produce in situ the surface active form of the fatty acid. Preferably the addition of the at least one alkaline compound is the last step in the preparation of the pre-dispersion before the homogenization step vi).

Preferably the inventive process encompasses the step v) of adding at least one silicon oil component D, which is a polydimethylsiloxane, and at least one alkaline compound, as further component E, to aqueous composition obtained in step iii) or in steps i) to iv), wherein at least one alkaline compound is selected from alkali metal hydroxide, alkali metal carbonate, alkali metal hydrogen carbonate, alkaline earth metal hydroxide, alkaline earth metal carbonate and alkaline earth metal hydrogen carbonate.

Homogenization Step vi)

The inventive process for the production of an stabilizer dispersion S comprises the homogenization of the aqueous composition obtained in steps i) to v) (i.e. the pre-dispersion prepared as described above) wherein the aqueous composition is passed at least once through at least one homogenization device, in particular through at least one homogenization nozzle, wherein the stabilizer dispersion S, consisting of an continuous phase and at least one disperse phase, is obtained.

Generally, the homogenization device used in step vi) effect the homogenization by powerful shearing of the dispersion, wherein turbulent flows under shear produce very powerful shear gradients, and the particles of the dispersion therefore impact one another at high velocity and become further dispersed. The homogenization device can be selected from any suitable dispersing units. There are several various embodiments of homogenizers and homogenization nozzles described in the state of the art. For example the homogenization can be carried out using a homogenization device based on a rotor/stator principle, e.g. a continuous rotor/stator homogenization device as described in WO 01/23489.

Preferably the homogenization in step vi) is carried out by using at least one homogenization device selected from hole type nozzles, slit type nozzles, perforated plates, gap diaphragms, diverting nozzles, two-stream nozzle and counter current dispersers.

It is also possible to work with combinations of two or more identical or different homogenization devices. Preferably 1 to 20, more preferably 1 to 10 homogenization devices may be utilized in the homogenization step vi).

Preferably the homogenization in step vi) is carried out by using a homogenization device comprising one or more homogenization nozzles, selected from hole type nozzles and slit type nozzles, more preferably one or more slit type nozzles. Preferably, the nozzles are formed as a perforated plate encompassing one or more holes and/or slits. Preferably the homogenization in step vi) is carried out by using one or more nozzles selected from hole type nozzles and slit type nozzles, wherein the nozzles may formed as a perforated plate encompassing each 1 to 1000, preferably 1 to 50, more preferably 5 to 50, holes or slits.

Further preferred embodiments of the homogenization device include a two-stream nozzle or the combination of two perforated plates and also the combination of perforated plate with diverting nozzles. As a result of a downstream perforated plate or diverting nozzle, typically a counter pressure arises, with the help of which it is possible to influence the cavitation results behind the first plate.

In particular the invention is directed to a process as described above wherein the homogenization step vi), preferably all steps i) to vi) of the inventive process, is/are carried out in a stirred tank equipped with at least one by-pass pipe, preferably equipped with at least one by-pass pipe and at least one pump, wherein the at least one by-pass pipe includes one or more homogenization nozzle, preferably selected from hole type homogenization nozzles, slit type homogenization nozzles, and perforated plates, and wherein the homogenization in step vi) is carried out by piping the aqueous composition through the at least one by-pass. Following in this preferred embodiment, the homogenization in step vi) is carried out by piping the aqueous composition through the by-pass(es) and through the one or more homogenization nozzles. More preferably the stirred tank used for the inventive process is equipped with at least one by-pass pipe, wherein the by-pass pipe comprising 1 to 20, more preferably 1 to 10 homogenization nozzles.

Preferably, the nozzles are formed as a perforated plate encompassing one or more holes and/or slits, wherein the plate is placed in the pipe cross section of the by-pass pipe. Preferably the perforated plates encompassing 2 to 10, more preferably 3 to 15, most preferably 5 to 10 holes and/or slits.

Preferably the homogenization in step vi) is carried out by piping the aqueous composition obtained in steps i) to v) (pre-dispersion) through the by-pass pipe and through the one or more homogenization nozzles, until at least 10 times, preferably at least 15 times, more preferably at least 20 times of the volume of the aqueous composition obtained in step iv) passed.

The emulsifying pressure in the homogenizing nozzle is typically in the range of 1 bar to 1000 bar, preferably 5 to 100 bar, more preferably 10 bar to 50 bar. The term emulsifying pressure is used to refer to the pressure drop over the homogenizing nozzle.

The inventive process for the production of a stabilizer dispersion S may comprise additional steps. For example the inventive process as described preferably encompasses the further step
vii) adding water, in particular demineralized water, to the stabilizer dispersion S obtained in step vi), so that the solid content of the stabilizer dispersion S is in the range of 45 to 65% by weight, preferably in the range of 50 to 60% by weight, based on the total dispersion.

Further, the inventive process as described may encompasses the addition of one or more further components, in particular the addition of one or more further components E as described above. One or more of the further components E may be added before, during or after any of the steps i) to vi).

In a preferred embodiment the invention is directed to the inventive process for producing a stabilizer dispersion S wherein the weight median average particle size $D_{50}$ of the disperse phase particles of the stabilizer dispersion S obtained in step vi) is less than or equal 3 μm, preferably less than or equal 2 μm and most preferably less than or equal 1.5 μm. In particular the weight median average particle size $D_{50}$ of the disperse phase particles of the stabilizer dispersion S is in the range of 0.1 to 3 μm, preferably in the range of 0.2 to 2 μm, more preferably in the range of 0.5 to 1.5 μm.

The particle size distribution, the weight mean average particle diameter $D_W$ and the weight median average particle diameter $D_{50}$ can be determined using a ultracentrifuge (for example as described in W. Scholtan, H. Lange: Kolloid Z. u. Z. Polymere 250, pp. 782 to 796, 1972) or a disc centrifuge (for example DC 24000 by CPS Instruments Inc.). The weight mean average particle diameter $D_w$ (or De Broucker mean particle diameter) is an average size based on unit weight of particle. The definition for the weight mean average particle size diameter $D_w$ can be given as:

$$D_W = \text{sum}(n_i * D_i^4) / \text{sum}(n_i * D_i^3)$$

$n_i$: number of particles with the diameter $D_i$
(see G. Lagaly, O. Schulz, R. Ziemehl: Dispersionen und Emulsionen: Eine Einführung in die Kolloidik feinverteilter Stoffe einschließlich der Tonminerale, Darmstadt: Steinkopf-Verlag 1997, ISBN 3-7985-1087-3, pages 279 to 283, formula 8.3b). The weight median diameter $D_{50}$ represents the diameter at which 50% by weight of the particles are less in size.

In another aspect the present invention relates to a process for producing a thermoplastic moulding composition using the inventive stabilizer dispersion S, wherein the thermoplastic moulding composition comprises a latex-type graft copolymer. In particular the thermoplastic moulding composition bases on at least one impact modified vinylaromatic copolymer, in particular selected from acrylonitrile butadiene styrene copolymers (ABS), acrylonitrile styrene acrylate copolymers (ASA) and methacrylate acrylonitrile butadiene styrene copolymers (MABS). Furthermore, the thermoplastic moulding composition may be based on commonly known blends of such impact modified vinylaromatic copolymer with polycarbonates PC or polyamides PA, such as ABS/PC or ABS/PA. Preferably the stabilizer dispersion S is used in the production of ABS copolymers wherein examples of suitable commercially available ABS polymer products are Novodur® and Terluran® obtainable from Ineos Styrolution company (Frankfurt, Germany). The invention also related to the molding compositions prepared by the processes described.

The present invention is directed to a process for producing a thermoplastic moulding composition comprising
  0 to 94.996% by weight, preferably 5 to 80% by weight, based on the total thermoplastic moulding composition, of a thermoplastic copolymer CA which comprises at least one vinylaromatic monomer;
  5 to 99.996% by weight, preferably 15 to 60% by weight, based on the total thermoplastic moulding composition, of a graft copolymer CB comprising a graft base CB1 and a graft shell CB2, wherein the graft copolymer CB is obtained by emulsion polymerization in particular is obtained by emulsion polymerization of the graft base CB1 and emulsion polymerization of the graft shell CB2 in the presence of the graft base CB1, and wherein the graft base CB1 has an glass transition temperature $T_g$ of less than 0° C.; wherein the glass transition temperature $T_g$ is measured by dynamic mechanical analysis (DMA) using a frequency of 1 Hz;
  0.002 to 5% by weight, preferably 0.01 to 3% by weight, more preferably 0.1 to 1% by weight, based on the total thermoplastic moulding composition, of at least one phenolic stabilizer A;
  0.002 to 5% by weight, preferably 0.01 to 3% by weight, more preferably 0.1 to 1% by weight, based on the total thermoplastic moulding composition, of at least one thio co-stabilizer B;
  0.0001 to 2% by weight, preferably 0.001 to 1% by weight, more preferably 0.01 to 0.2% by weight, based on the total thermoplastic moulding composition, of at least one silicon oil component D;

0 to 30% by weight, preferably 0 to 10% by weight, more preferably 0.01 to 1% by weight, based on the total thermoplastic moulding composition, of at least one further component K, encompassing the following steps:

x) adding a stabilizer dispersion S, obtained by the inventive process for producing a stabilizer dispersion S as described above, to the graft copolymer CB after its emulsion polymerisation;

xi) precipitation of the graft copolymer CB, obtained in step x) (including the stabilizer dispersion S), by adding a precipitation solution comprising at least one salt;

xii) mechanical dewatering, optional washing and/or optional drying of the precipitated graft copolymer CB obtained in step xi);

xiii) optional mixing the graft copolymer CB obtained in step xii) with a copolymer CA, and optional with further components K.

In a preferred embodiment the amounts of the components CA, CB, A, B, D and optional K are summed up to 100% by weight. In particular the amount of the graft copolymer CB can adapted so that the sum of the compounds results in 100% by weight.

The at least one phenolic stabilizer A; the at least one thio co-stabilizer B; the at least one silicon oil component D; and the stabilizer dispersion S are described in detail above in connection with the inventive process for the production of the stabilizer dispersion.

Thermoplastic Copolymer CA

Preferably the thermoplastic copolymer CA is free of any latex type polymer (rubber free) and comprises at least 50% by weight of one or more vinyl aromatic monomer(s) CA1, preferably selected from styrene, α-methyl styrene, and mixtures of styrene with other co-monomers. In particular the at least one thermoplastic copolymer CA, can be selected from polystyrene, copolymers of styrene, e.g. styrene acrylonitrile copolymers, copolymers of α-methyl styrene, e.g. α-methyl styrene acrylonitrile copolymers, polycarbonates, polyamides, and polyesters.

Preferably the thermoplastic copolymer CA contains at least one vinyl aromatic monomer, preferably selected from styrene, alpha-methylstyrene and para-methylstyrene, in an amount of 69-81% by weight, preferably 70 to 76% by weight, more preferably 72 to 76% by weight, and at least one vinyl cyanide monomer, preferably acrylonitrile and/or methacrylonitrile, in an amount of 19 to 31% by weight, preferably 24 to 30% by weight, more preferably 24 to 28% by weight.

Typically, the number-average molar mass ($M_n$) of the thermoplastic copolymer CA amounts from 15,000 to 100,000 g/mol (determined by means of GPC with UV detection). The viscosity (Vz) of the thermoplastic copolymer CA may be for example in the range of 50 to 120 ml/g (measured to DIN 53726 at 25° C. in a 0.5% strength by weight solution in DMF).

The copolymer CA can be prepared by all known method, for example bulk polymerization, solution polymerization, suspension polymerization and emulsion polymerization or mixed process, e.g. mass/suspension polymerizations, with or without further components. More preferably the copolymer CA is prepared from the components acrylonitrile and styrene and/or α-methylstyrene via bulk polymerization or in the presence of one or more solvents, for example, toluene or ethylbenzene. A polymerization process is for example described in Kunststoff-Handbuch [Plastics Handbook], ViewegDaumiller, volume V, (Polystyrol) [Polystyrene], Carl-Hanser-Verlag, Munich 1969, pages 122 et seq.

In a preferred embodiment the thermoplastic copolymer CA is a SAN copolymer composed of the monomers CA1 and CA2, wherein the at least one vinyl aromatic monomer CA1 is selected from styrene, α-methyl styrene, and mixtures thereof; the at least one vinyl cyanide monomer CA2 is acrylonitrile.

Graft Copolymer CB

The graft copolymer CB often has a complex structure and is in essence composed of a graft base CB1 and a graft shell CB2. The graft rubber CB is polymerized by emulsion polymerization, wherein firstly the graft base CB1 is obtained via emulsion polymerization of the monomers CB11 and CB12 as described below and afterwards the graft shell CB2 is obtained via emulsion polymerization of the monomers CB21 and CB22 as described below in the presence of the graft base CB1. Preferably, the graft rubber CB is polymerized by aqueous free-radical emulsion polymerization. The reaction is typically initiated via water-soluble or oil-soluble free-radical polymerization initiators, e.g. inorganic or organic peroxides, such as peroxodisulfate or benzoyl peroxide, or with the aid of redox initiator systems. The documents WO 2002/10222, DE-A 28 26 925, and also EP-A 022 200 describe suitable polymerization processes.

The at least one graft copolymer CB is present in the thermoplastic moulding composition in an amount of at least 5% by weight, preferably at least 15% by weight, more preferably at least 25% by weight, based on the total thermoplastic moulding composition.

The average particle diameter of graft copolymer CB may vary from 50 nm to 10,000 nm, preferred 80 nm to 3,000 nm, more preferred from 100 nm to 2,000 nm.

Typically, the graft base CB1 consists of a polymer, preferably an at least partially crosslinked polymer, with glass transition temperature below 0° C., preferred below −20° C., more preferred below −40° C.

The graft base CB1 itself might be a core/shell polymer with a polymer base and at least one graft shell showing different monomer composition. The graft shell CB2 of graft rubber CB typically consists of monomers which copolymerize yielding a polymer with a glass transition temperature or more than +20° C., preferably more than +60° C. Preferred monomers of graft shell CB2 (monomers CB21 and CB22 mentioned below) are selected from styrene, alpha-methylstyrene, (meth)acrylonitrile, methyl(meth) acrylate, ethylacrylate, N-phenylmaleic imide and maleic anhydride. The graft shell can for example be obtained via reaction of styrene and acrylonitrile, and also from 0.01 to 5% by weight of ancillary components (% by weight, based on the graft shell), in the presence of the graft base.

Graft copolymers CB which can be preferably used in the inventive process are for example graft latexes described in EP-B 0 845 496, WO 2009/071537 and WO 2014/170407.

In a preferred embodiment the invention is directed to a process for producing a thermoplastic moulding composition comprising:

0 to 94.96% by weight, preferably 5 to 80% by weight, based on the total thermoplastic moulding composition, of a thermoplastic copolymer CA consisting of:

CA1 50 to 95% by weight, based on the copolymer CA, of one or more vinyl aromatic monomer(s) CA1, preferably selected from styrene, α-methyl styrene, and mixtures of styrene and at least one more monomer selected from α-methyl styrene, p-methyl styrene and (meth)acrylic acid $C_1$-$C_8$-alkyl esters;

CA2 5 to 50% by weight, based on the copolymer CA, of one or more vinyl cyanide monomer(s) CA2, preferably selected from acrylonitrile and mixtures of acrylonitrile and at least one monomer selected from methacrylonitrile, anhydrides of unsaturated carbon acids (e.g. maleic anhydride, phthalic anhydride) and imides of unsaturated carbon acids (N-substituted maleimide, such as N-cyclohexyl maleimide und N-phenyl maleimide);
CA3 0 to 12% by weight, based on the copolymer CA, of one or more unsaturated copolymerizable monomers CA3 different from CA1 and CA2;
5 to 99.96% by weight, preferably 15 to 60% by weight, based on the total thermoplastic moulding composition, of at least one thermoplastic graft copolymer CB, comprising
5 to 95% by weight, based on the graft copolymer CB, of at least one graft base CB1, which is obtained by emulsion polymerization of
CB11: 50 to 100% by weight, based on the graft base CB1, of at least one monomer B11 selected from butadiene or $C_1$-$C_{10}$ alkyl acrylates, preferably selected from butyl acrylate, ethylhexyl acrylate and cyclohexyl acrylate, more preferably n-butyl acrylate,
CB12: 0 to 50% by weight, based on the graft base CB1, of at least one further monomer CB12 selected from styrene, α-methyl styrene, acrylonitrile; methacrylonitrile, isoprene, chloroprene, $C_1$-$C_4$ alkyl styrene, $C_1$-$C_8$-alkyl (meth)acrylates, and cross-linking monomers, such as alkylenglykol-di(meth)acrylate and divinylbenzene;
and
5 to 95% by weight, based on the graft copolymer CB, of at least one graft shell CB2, which is obtained by emulsion polymerization in the presence of the at least one graft base CB1 of:
CB21 50 to 95% by weight, based on the graft shell CB2, of a monomer CB21, selected from styrene, α-methyl styrene, and mixtures of styrene and at least one more monomer selected from α-methyl styrene, p-methyl styrene and (meth)acrylic acid $C_1$-$C_8$-alkyl esters,
CB22 5 to 50% by weight, based on the graft shell CB2, of a monomer B22, selected from acrylonitrile and mixtures of acrylonitrile and at least one more monomer selected from methacrylonitrile, anhydrides of unsaturated carbon acids (e.g. maleic anhydride, phthalic anhydride) and imides of unsaturated carbon acids (e.g. N-substituted maleimide, such as N-cyclohexyl maleimide und N-phenyl maleimide) wherein the sum of graft base CB1 and graft shell CB2 is 100% by weight;
0.002 to 5% by weight, preferably 0.01 to 3% by weight, more preferably 0.1 to 1% by weight, based on the total thermoplastic moulding composition, of at least one phenolic stabilizer A;
0.002 to 5% by weight, preferably 0.01 to 3% by weight, more preferably 0.1 to 1% by weight, based on the total thermoplastic moulding composition, of at least one thio co-stabilizer B;
0.0001 to 2% by weight, preferably 0.001 to 1% by weight, more preferably 0.01 to 0.2% by weight, based on the total thermoplastic moulding composition, of at least one silicon oil component D;
0 to 30% by weight, based on the total thermoplastic moulding composition, of at least one further component K.
In a preferred embodiment the monomer CB11 is butadiene, more preferably the graft base CB1 consists of a butadiene polymer. The butadiene monomer CB11 can optionally be copolymerized with other monomers, for example styrene, acrylonitrile, (meth)acrylates or multifunctional monomers (monomers CB12).

The graft base CB1 can by way of example be obtained via reaction of from 0 to 10% by weight of styrene and from 90 to 100% by weight of butadiene.

In another preferred embodiment the at least one monomer CB11 of the graft base CB1 is selected from $C_1$-$C_{10}$ alkyl acrylates, preferably butyl acrylate, ethylhexyl acrylate and cyclohexyl acrylate, more preferably n-butyl acrylate. Preferably said monomer CB11 are used together with at least one cross-linking monomer CB12, which is a double unsaturated monomer, for example selected from alkylenglykol-di(meth)acrylate, allyl (meth)acrylate, divinylbenzene, diallyl maleate, diallyl fumarate, diallyl phthalate, triallyl cyanurate, and dicyclopentadienyl acrylate, in particular from divinylbenzene or allyl(meth)acrylate.

In a preferred embodiment the thermoplastic moulding composition is based on an ABS copolymer. The thermoplastic moulding composition preferably comprises:
5 to 94.96% by weight, preferably 5 to 80% by weight, based on the total thermoplastic moulding composition, of a copolymer CA consisting of:
CA1 50 to 95% by weight, based on the copolymer CA, of one or more vinyl aromatic monomer(s) CA1, selected from styrene, α-methyl styrene, and mixtures of styrene and at least one more monomer selected from α-methyl styrene, p-methyl styrene and (meth)acrylic acid $C_1$-$C_8$-alkyl esters;
CA2 5 to 50% by weight, based on the copolymer CA, of one or more vinyl cyanide monomer(s) CA2, selected from acrylonitrile and mixtures of acrylonitrile and at least one more monomer selected from methacrylonitrile, anhydrides of unsaturated carbon acids and imides of unsaturated carbon acids;
CA3 0 to 12% by weight, based on the copolymer CA, of one or more unsaturated copolymerizable monomers CA3 different from CA1 and CA2;
5 to 94.99% by weight, based on the total thermoplastic moulding composition, of a graft copolymer CB comprising
CB1: 40 to 85% by weight, based on the graft copolymer CB, of at least one graft base CB1, which is obtained by emulsion polymerization of:
CB11: 50 to 100% by weight, based on the graft base CB1, butadiene,
CB12: 0 to 50% by weight, based on the graft base CB1, at least one further monomer selected from styrene, α-methyl styrene, acrylonitrile; methacrylonitrile, isoprene, chloroprene, $C_1$-$C_4$ alkyl styrene, (meth)acrylic acid $C_1$-$C_8$-alkyl esters, alkylenglykol-di(meth)acrylate and divinylbenzene;
wherein the sum of CB11+CB12 is 100% by weight; and
CB2: 15 to 60% by weight, based on the graft copolymer CB, of at least one graft shell CB2, which is obtained by emulsion polymerization in the presence of the at least one graft base CB1 of:
CB21 50 to 95% by weight, based on the graft shell CB2, of a monomer B21, selected from styrene, α-methyl styrene, and mixtures of styrene and at least one more monomer selected from α-methyl styrene, p-methyl styrene and (meth)acrylic acid $C_1$-$C_8$-alkyl esters, CB22 5 to 50% by weight, based on the graft shell CB2, of a monomer B22, selected from acrylonitrile and mixtures of acrylonitrile and at least one more monomer selected from methacrylonitrile, anhydrides of unsaturated carbon acids (e.g. maleic anhydride, phthalic anhydride) and imides of unsaturated carbon acids (e.g. N-substituted maleimide, such as N-cyclohexyl maleimide und N-phenyl maleimide)
wherein the sum of graft base CB1 and graft shell CB2 is 100% by weight;

0.002 to 5% by weight, preferably 0.01 to 3% by weight, more preferably 0.1 to 1% by weight, based on the total thermoplastic moulding composition, of at least one phenolic stabilizer A;

0.002 to 5% by weight, preferably 0.01 to 3% by weight, more preferably 0.1 to 1% by weight, based on the total thermoplastic moulding composition, of at least one thio co-stabilizer B;

0.0001 to 2% by weight, preferably 0.001 to 1% by weight, more preferably 0.01 to 0.2% by weight, based on the total thermoplastic moulding composition, of at least one silicon oil component D;

0 to 30% by weight, preferably 0 to 10% by weight, more preferably 0.01 to 1% by weight, based on the total thermoplastic moulding composition, of at least one further component K, wherein step xiii) is:

xiii) mixing of the copolymer CA, obtained via polymerization of the monomers CA1, CA2 and optional further monomers CA3, and the graft copolymer CB obtained in step xii) and optional further components K.

Preferably the graft base CB1, having a multi- or bimodal, more preferably a bimodal, particle size distribution, is obtained by agglomerating the graft base after its emulsion polymerisation, using a agglomerating copolymer, in particular an agglomerating latex, as described in WO 2008/020012, wherein the graft shell CB2 is obtained by emulsion polymerization of the monomers CB21 and CB22 in the presence of the agglomerated graft base.

In a preferred embodiment the graft copolymer CB comprises

CB1: 40 to 85% by weight, based on the graft copolymer CB, of at least one graft base CB1, which is obtained by emulsion polymerization of:
CB11: 79 to 100% by weight, based on the graft base CB1, butadiene,
CB12: 0 to 21% by weight, based on the graft base CB1, at least one further monomer selected from styrene, α-methyl styrene, acrylonitrile; methacrylonitrile, isoprene, chloroprene, $C_1$-$C_4$ alkyl styrene, (meth)acrylic acid $C_1$-$C_8$-alkyl esters, alkylenglykoldi(meth)acrylate and divinylbenzene;
wherein the sum of CB11+CB12 is 100% by weight;
and agglomerating the obtained graft base CB1 by adding
0.01 to 5 parts by weight, based on 100 parts by weight of the graft base CB1, in each case based on the solids content, of an agglomerating copolymer CP composed of
CP1: 80 to 99.9 wt % of one or more hydrophobic $C_1$ to C12 alkyl acrylates or $C_1$ to $C_{12}$ alkyl methacrylates and
CP2: 0.1 to 20 wt % of one or more hydrophilic comonomers selected from the group consisting of methacrylamide, acrylamide, methylacrylamide, ethylacrylamide and n-butylacrylamide,
where CP1 and CP2 sum to 100 wt %;
and
CB2: 15 to 60% by weight, based on the graft copolymer CB, of at least one graft shell CB2, which is obtained by emulsion polymerization in the presence of the agglomerated at least one graft base CB1 of:
CB21 70 to 90% by weight, based on the graft shell CB2, of a monomer B21, selected from styrene, α-methyl styrene, and mixtures of styrene and at least one more monomer selected from α-methyl styrene, p-methyl styrene and (meth)acrylic acid $C_1$-$C_8$-alkyl esters,
CB22 10 to 30% by weight, based on the graft shell CB2, of a monomer B22, selected from acrylonitrile and mixtures of acrylonitrile and at least one more monomer selected from methacrylonitrile, anhydrides of unsaturated carbon acids (e.g. maleic anhydride, phthalic anhydride) and imides of unsaturated carbon acids (e.g. N-substituted maleimide, such as N-cyclohexyl maleimide und N-phenyl maleimide)
wherein the sum of graft base CB1 and graft shell CB2 is 100% by weight;

and wherein the agglomerated graft base CB1 has a bimodal particle size distribution including a fraction of particles having a $D_{50}$ value in the range of 80 to 330 nm, preferably in the range of 80 to 150 nm, and a fraction of particles having a $D_{50}$ value in the range of from 350 to 550 nm, preferably in the range of 340 to 480 nm.

In particular preferred embodiments of graft base CB1 are described in DE-A 102005 022632, examples $S_{11}$ to $S_{13}$, and WO 2014/170406, examples A1 to A3. In particular preferred embodiments of agglomerating copolymer CP are described in WO 2008/020012, examples 3.1a to 3.1 h, and WO 2014/170406A1, examples C-1 and C-2. Preferably, the graft copolymer CB as described in WO 2014/170406, see "Pfropfcopolymer B, Allgemeine Vorgehensweise", pp 34-35, is used according to the present invention.

In a preferred embodiment the graft copolymer CB is an ABS graft rubber composed of a graft base CB1, obtained by emulsion polymerization of monomer B11 which is butadiene and monomer B21 which is styrene, and a graft shell CB2, which is obtained by emulsion polymerization of monomer CB21, selected from styrene, α-methyl styrene, and mixtures thereof, and the monomer B22, which is acrylonitrile, in the presence of the graft base CB1.

The particle size distribution of the graft rubber CB can be mono-, bi-, or poly-modal. According to one particularly preferred embodiment of the invention, the particle size distribution is bimodal.

The molding composition can also comprise two or more different graft rubbers CB. In a preferred embodiment the graft copolymer CB is a mixture of at least two graft copolymers CB-I and CB-II, wherein
the graft copolymer CB-I is obtained via emulsion polymerization of a mixture of the monomers CB21 and CB22 in the presence of a graft base CB1-I, which has an particle diameter $D_{50}$ in the range of 80 to 330 nm,
and graft copolymer CB-II is obtained via emulsion polymerization of a mixture of the monomers CB21 and CB22 in the presence of a graft base CB1-II, which has an particle diameter $D_{50}$ in the range of 340 to 480 nm.

Further Component K

In particular the thermoplastic moulding composition obtained by the inventive process may comprises 0 to 30% by weight, preferably 0 to 10% by weight, based on the total thermoplastic moulding composition, of at least one further component K. More preferably the at least one further component K is present in an amount of 0.001 to 10% by weight, more preferably 0.01 to 5% by weight, based on the total thermoplastic moulding composition.

The optional further component K may be selected from commonly known additives and/or auxiliaries for plastic materials. With respect to conventional auxiliaries and additives, reference is made by way of example to "Plastics Additives Handbook", Ed. Gächter and Müller, 4th edition, Hanser Publ., Munich, 1996. For example the at least one further component K may be selected from fillers, reinforcing agents, dyes, pigments, lubricants or mould-release agents, stabilizers, in particular light and heat stabilizers, antioxidants, UV absorbers plasticizers, impact modifiers, antistatic agents, flame retardants, bactericides, fungicides, optical brighteners, and blowing agents.

The optional at least one further component K is preferably selected from dyes, pigments, lubricants or mould-release agents, stabilizers, in particular light stabilizers, antistatic agents, flame retardants and fillers, in particular mineral fillers.

Furthermore, it is possible that the thermoplastic composition comprises as further component K residues of the at least one surfactant C used for production of the stabilizer dispersion S as described above, selected from surface active agents and protective colloids.

In another embodiment the at least one further component K may be at least one further polymer selected from polycarbonates and polyamides.

Preferably, the further component is at least one aromatic polycarbonate and/or at least one aromatic polyester carbonate. Aromatic polycarbonates and/or aromatic polyester carbonates, which may be suitable for the present invention, are described in the state of the art and may be prepared by known processes. In particular the preparation of aromatic polycarbonate/aromatic polyester carbonate is carried out by reacting diphenols, preferably bisphenole A, carbonic acid halides, preferably phosgene, and optionally aromatic dicarboxylic acid halides, preferably benzenedicarboxylic acid halides. For example suitable aromatic polycarbonates and aromatic polyester carbonate and their preparation are described in DE-A 2 714 544, DE-A 3 000 610, DE-A 3 832 396 and DE-A 3 077 934.

Preferably, the further component is at least one polyamide selected from homopolyamides, copolyamides and mixtures of such polyamides. Suitable poloymaides and methods for their production are known from the state of the art. In particular suitable semi-crystalline polyamides are polyamide-6, polyamide-6,6, mixtures and corresponding copolymers of those components. Also included are polyamides wherein the acid component consists wholly or partially of terephthalic acid and/or isophthalic acid and/or suberic acid and/or sebacic acid and/or azelaic acid and/or adipic acid and/or cyclohexanedicarboxylic acid, the diamine component consists wholly or partially of m- and/or p-xylylene-diamine and/or hexamethylenediamine and/or 2,2,4-trimethylhexamethylenediamine and/or 2,2,4-trimethylhexamethylenediamine and/or isophoronediamine, In particular amorphous polyamides can be used as further component K, which are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid. Examples that may be mentioned of fillers, which may be selected from particulate fillers or reinforcing agents, are silicates, amorphous silica, calcium silicates, such as wollastonite, powdered quartz, mica, metal oxides, metal hydroxides, carbon black, graphite, barium sulfate, calcium carbonate, magnesium carbonate, bentonites, talc, kaolin, carbon fibres or glass fibres in the form of glass woven, glass mats, or glass silk rovings, chopped glass, or glass beads. In particular at least one particulate fillers, preferably a mineral filler, can be used as further component K.

Examples of suitable pigments are titanium dioxide, phthalocyanines, ultramarine blue, iron oxides, or carbon black, and also the entire class of organic pigments.

Common stabilizers for thermoplastic polymers encompass stabilizers for improving thermal stability, which are commonly agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, and benzophenones. Examples of suitable stabilizers are hindered phenols, but also vitamin E and compounds whose structure is analogous thereto. HALS stabilizers (Hindered Amine Light Stabilizers), benzophenones, resorcinols, salicylates, and benzotriazoles are also suitable.

Examples of suitable antistatic agents are amine derivatives, such as N,N-bis(hydroxyalkyl)alkylamines or -alkyleneamines, alkylsulfonates, polyethylene glycol esters, copolymers composed of ethylene oxide glycol and of propylene oxide (in particular two-block or three-block copolymers in each case composed of ethylene oxide blocks and of propylene oxide blocks) glycol, and glycerol mono- and distearates, and also mixtures of these.

Suitable lubricants or mould-release agents are fatty acids having from 12 to 30 carbon atoms, salts and derivatives thereof, for example stearic acid and stearates, stearyl alcohol, stearic esters, amide waxes (e.g. stearamides, in particular ethylene bis(stearamide) (EBS)), and polyolefin waxes. Particularly suitable lubricants and mould-release agents are stearic acid, stearates (e.g. magnesium stearate), ethylene bis(stearamide) (e.g. Irgawax®, Ciba, Switzerland) and mixtures thereof. Preferably the thermoplastic moulding composition comprises 0.05 to 5% by weight, preferably 0.1 to 3% by weight, based on the total thermoplastic moulding composition, of at least one lubricant or mould-release agents, more preferably ethylene bis(stearamide) and/or magnesium stearate. In a preferred embodiment the thermoplastic moulding composition comprises 0.1 to 5% by weight, based on the total thermoplastic moulding composition, ethylene bis(stearamide) and 0.05 to 1% by weight, based on the total thermoplastic moulding composition, magnesium stearate.

Steps of the Process for Producing a Thermoplastic Moulding Composition

The inventive process for producing a thermoplastic moulding composition encompasses step x) adding a stabilizer dispersion S, obtained by the inventive process for producing a stabilizer dispersion S as described above, to the graft copolymer CB after its emulsion polymerisation. In particular this means that the aqueous stabilizer dispersion S is added to the graft copolymer CB, which is in form of an aqueous latex.

Preferably the stabilizer dispersion S is added to the graft copolymer CB after its emulsion polymerization in step x) in an amount of 0.01 to 10% by weight, preferably 0.05 to 2% by weight, more preferably 0.1 to 1.5% by weight, based on the solid contents of the stabilizer dispersion S and the graft copolymer latex CB (i.e. % by weight of solids of stabilizer dispersion S/% by weight solids of graft copolymer CB).

Corresponding to the definition of the solid content of the stabilizer dispersion S the solid content of the graft copolymer (res. the graft copolymer latex or the precipitated graft copolymer obtained in step xi) refers to and is equal to the weight content of the non-volatile compounds in the graft copolymer. The solid content is in particular equal to the solid content determined gravimetrically by removing the volatile compounds (in particular water), for example by evaporation at 150 to 180° C. for about 10 to 120 min in a drying cabinet.

Typically at least one aqueous stabilizer dispersion S as described above is mixed with the graft copolymer CB after its emulsion polymerisation under stirring.

The inventive process for producing a thermoplastic moulding composition encompasses step xi) the precipitation of the graft copolymer CB obtained in step x) (including the stabilizer dispersion S) by adding a precipitation solution comprising at least one salt. Typically the graft copolymer CB obtained in step x) is precipitated using a precipitation solution comprising at least one salt or at least one salt and at least one acid. Preferred salts are selected from magnesium sulfate, calcium chloride; magnesium sulfate monohydrate (kieserite $Mg[SO_4].H_2O$), magnesium sulfate pentahydrate (pentahydrate $Mg[SO_4].5H_2O$), magnesium sulfate hexahydrate (hexahydrite $Mg[SO_4].6H_2O$) and magnesium sulfate heptahydrate (epsomite $Mg[SO_4].7H_2O$). Preferred acids are selected from sulfuric acid, phosphoric acid, and acetic acid.

In a preferred embodiment step xi) encompasses the precipitation of the graft copolymer CB, obtained in step x), by adding a precipitation solution comprising at least one salt and at least one acid. Preferably the precipitation solution is firstly provided, e.g. in a precipitation tank, following the graft copolymer CB (mixture of graft copolymer CB and stabilizer dispersion S) is added into the precipitation solution under stirring, and afterwards the obtained precipitation mixture is heated up.

Typically the precipitation solution used in the inventive process is prepared by mixing water with at least one salt or an saturated solution of the salt and/or at least one acid. Typically the precipitation solution comprises 0.1 to 5% by weight, preferably 0.2 to 1% by weight of the of the at least one salt and/or at least one acid.

Preferably, the amount of the at least one salt and/or at least one acid (e.g. magnesium sulfate and/or sulfuric acid (96% by weight)) is used in such way that the concentration of the at least one salt and/or the at least one acid is in the range of 0.01 to 1% by weight, preferably in the range of 0.05 to 0.7% by weight, based on the total aqueous phase of the precipitation mixture. More preferably the amount of the at least one salt is used in such way that the concentration of the at least one salt is in the range of 0.1 to 1% by weight, preferably in the range of 0.2 to 0.75% by weight, based on the total aqueous phase of the precipitation mixture. More preferably the amount of the at least one acid is used in such way that the concentration of the at least one acid is in the range of 0.01 to 0.5% by weight, preferably in the range of 0.02 to 0.1% by weight, based on the total aqueous phase of the precipitation mixture. The precipitation mixture typically refers to the mixture of graft copolymer CB obtained in step x) (res. the mixture of graft copolymer CB and stabilizer dispersion S) and the precipitation solution.

Typically the precipitation in step xi) is carried out at temperatures in the range of 40° C. to 150° C., preferably 60 to 95° C. In a preferred embodiment step xi) is carried out by adding the graft copolymer CB (including the stabilizer dispersion S) obtained in step x) into the precipitation solution under stirring.

Preferably the solid content of the graft copolymer CB (including stabilizer dispersion S) used in precipitation step xi) is in the range of 5 to 30% by weight, preferably 10 to 25% by weight, more preferably 15 to 20% by weight.

Preferably the solid content of the precipitated dispersion obtained in the precipitation step xi) (which can be regarded as a mixture of graft copolymer CB, including stabilizer dispersion S, and precipitation solution) is in the range of 5 to 20% by weight, more preferably in the range of 10 to 15% by weight.

The inventive process for producing a thermoplastic moulding composition encompasses step xi) mechanical dewatering, optional washing and/or optional drying of the precipitated graft copolymer CB obtained in step xi).

Typically, the precipitated graft copolymer CB is at least partially dewatered in particular by centrifugation and/or filtration. Preferably the precipitated graft copolymer CB is at least partially mechanically dewatered and separated from the aqueous phase using a centrifuge.

Typically the graft copolymer CB obtained after mechanical dewatering has a residual moisture level in the range of 10 to 50% by weight, preferably 20 to 40% by weight, more preferably 25 to 35% by weight.

The residual moisture level refers to the amount of water given in % by weight, based on the total wet graft copolymer CB. Typically the residual moisture level can be determined using suitable apparatus, such as a drying scales. Typically the sample is dried over a given period as long as a constant weight level is maintained. For example the residual moisture level can be determined in an Halogen Moisture Analyzer HR73 from Mettler-Toledo, at 180° C., maintaining a constant weight for 30 seconds.

In a further preferred embodiment the graft copolymer CB is washed once or several times after mechanical dewatering wherein the separated graft copolymer CB is brought in contact with water or a mixture of water and a polar organic solvent miscible with water (optional washing step). After washing the graft copolymer CB is typically separated from the water, e.g. by centrifugation.

Optional the dewatered or dewatered and washed graft copolymer CB may be dried, for example using a cabinet dryer or other common known drying apparatus, such as flash dryer or fluidized bed dryer. The graft copolymer CB can also be dried as described in DE-A 19907136. Typically the optional drying step is carried out at a temperature in the range of 50 to 160° C.

Preferably, after step xii) the graft copolymer CB is in form of a dried polymer latex powder having a residual moisture level of less than 5% by weight, preferably less than 2% by weight, more preferably less than 1% by weight.

It is also suitable to mix graft copolymer CB in step xiii) in the form of moist crumb having a residual moisture level of from 1 to 40% by weight, in particular from 20 to 40% by weight, whereupon then the complete drying of the graft copolymers takes place during the mixing process (step xiii).

The inventive process for producing a thermoplastic moulding composition encompasses the optional step xiii) mixing the graft copolymer CB obtained in step xii) with a copolymer CA, and optional with further components K.

Preferably, if the copolymer CA is present, step xiii) encompasses mixing of the copolymer CA, obtained via polymerization of the monomers CA1, CA2 and optional further monomers CA3, and the graft copolymer obtained in step xii) and optional further components K.

Methods and devices for mixing the graft copolymer CB with other polymers and/or other components selected from additives and auxiliaries as mentioned above are known by a skilled person. Typically step xiii) encompasses melt-compounding and/or melt-extrusion and can typically be carried out using one or more kneaders, extruders and/or twin shaft screw.

Preferably the mixing in step xiii), in particular the mixing of the dried graft copolymer CB, the thermoplastic copolymer CA and optional further components K, is carried out at temperatures in the range of 200 to 300° C.

The mixing in step xiii), in particular the mixing of the dried graft copolymer CB, the thermoplastic copolymer CA and optional further components K, may be carried out successively or simultaneously. Furthermore it is suitable to mix some or all of the components at a temperature of 15 to 40° C., in particular at room temperature, in a first step, and afterwards raising the temperature up to 200 to 300° C., optionally under addition of further additives, in a second step.

In a preferred embodiment no silicon oil is added as further component K in the process for producing the thermoplastic moulding composition. Thus, preferably the total amount of silicon oil contained in the thermoplastic moulding composition is added in step x) by adding the stabilizer dispersion S. In this preferred embodiment of the invention further compounding steps can be reduced.

The inventive thermoplastic compositions can be used to produce formed parts by any commonly known method, e.g. injection moulding, extrusion, blow moulding. For example the formed parts can be selected from plates, semi-manufactured products, films, fibres and foams. In particular said moulded parts can for example used in the automobile sector, e.g. in bodywork construction for vehicles, for the interior of automobiles. The mouldings of the invention can be employed, in particular, in the construction of ships, aircraft or trains, in particular as lining parts, undertray components, dashboards, shell construction for seats, bulkheads. Furthermore, nonautomotive applications of the mouldings of the invention are also conceivable, e.g. formwork plates, lining elements, supporting shells and casing components.

Particular preferred embodiments are also described in the claims.

FIG. 1 shows a stirred tank equipped with a by-pass and a homogenization slit nozzle that can be used for the inventive process for producing a stabilizer dispersion S. The symbols in FIG. 1 have the following meanings:
(1) stirred tank
(2) slit nozzle
(3) stirrer
(4) compressor pump
(5) by-pass pipe
(6) valves
(7) temperature control unit
(A) storage and supply tank for the at least one phenolic stabilizer A
(B) storage and supply tank for at least one thio co-stabilizer B
(C) storage and supply tank for the at least one surfactant C
(D) storage and supply tank for the at least one silicon oil component D
(E) storage and supply tank for the at least one further component E
(P) storage and supply tank for the aqueous phase P The components A and B are added successively through supply pipes from (A) and (B) into the stirred tank (1) as described in claim 1. The other components are typically added via pipe into the stirred tank as indicated in FIG. 1 and described above. After preparation of the pre-dispersion in the stirred tank the mixture is passed via by-pass pipe (5) through the homogenization slit nozzle (2).

For example a typical embodiment encompasses
(1) stirred tank with a volume of 10 m$^3$
(A) storage and supply tank for Wingstay® L (component A) in form of Big Bags
(B) storage and supply tank for Irganox@PS 800 (component B) in form of Big Bags,
(C) storage and supply tank for oleic acid (surfactant C) in form of an intermediate bulk container of 1 m$^3$
(D) storage and supply tank for silicon oil in form of an intermediate bulk container of 1 m$^3$
(E) storage and supply tank for further component, e.g. causic soda solution
(P) storage and supply tank for hot and cold demineralized water.

The present invention is further illustrated by the following examples and claims.

EXPERIMENTAL EXAMPLES

Example I. Preparation of Stabilizer Dispersions S a. The Following Compounds are Used
A: phenolic stabilizer, Wingstay® L from Omnova Solutions Inc., US (butylated reaction product of p-cresol and dicyclopentadiene, CAS Reg. No. 68610-51-5),
B: thio co-stabilizer, Irganox® PS 800 from BASF SE (didodecyl-3,3'-dithiopropionate),
C1: surfactant, potassium stearate,
C2: surfactant, oleic acid,
D: silicon oil, polydimethylsiloxane with a kinematic viscosity of 30,000 mm$^2$/s,
E1: caustic soda solution (sodium hydroxide) with solid content of 30% by weight or 32% by weight.

The solid contents of stabilizer dispersions S were measured by evaporation of the samples at 180° C. for 25 min in a drying cabinet.

b. Stabilizer Dispersion S1

A stabilizer dispersion S1 were prepared in accordance with DE 199 46 519 A1 using a rotor-stator mixer with a tip speed of 21 m/s.

55 parts of demineralized water and 5 parts of potassium stearate C1 are provided first at 60° C. in a glass baker and mixed with a stirrer. 20 parts of B are added and molten and the temperature is maintained at 60° C. After completion of the melting the mixture is mixed with a rotor-stator-mixer with a tip speed of 21 m/s for 5 minutes. After this 20 parts of A is added to the mixture at 60° C. and mixed with a stirrer followed by mixing with the rotor-stator-mixer with a tip speed of 21 m/s for 3 minutes.

Total batch size: 200.0 g
Solid content by theory: 45.0% by weight
Solid content measured: 46.17% by weight Under a microscope particles in the range of 2 to 6 μm and some large particles in the range of 20 μm are visible. After one day at room temperature the dispersion segregated into a lower solid part and an upper liquid part.

c. Stabilizer Dispersion S2

A stabilizer dispersion S2 were prepared in accordance with DE 199 46 519 A1 using a rotor-stator mixer with a tip speed of 21 m/s.

14.95 parts of demineralized water and 2.96 parts of potassium stearate C1 were provided first at 80° C. in a glass baker and mixed with a stirrer. 26.02 parts of B were added and molten and the temperature was maintained at 80° C. After completion of the melting the mixture was mixed with a rotor-stator-mixer with a tip speed of 21 m/s for 5 minutes. After this 26.02 parts of A was added to the mixture at 80° C. while simultaneously the mixing with the rotor-stator-mixer with a tip speed of 21 m/s is continued for for 3 minutes. Finally, 30.05 parts of demineralized water was added and mixed with stirrer.

Total batch size: 200.0 g
Solid content by theory: 55.0% by weight
Solid content measured: 54.67% by weight Under a microscope particles in the range of 2 to 6 μm and some large particles in the range of up to 40 μm were visible. After one day at room temperature the dispersion segregated into a lower solid part and an upper liquid part.

d. Stabilizer Dispersion S3 (Inventive Example)

A stabilizer dispersion S3 comprising components A, B and C was prepared using a batch type rotor-stator mixer with a tip speed of 21 m/s.

16.83 parts of demineralized water and 2.90 parts of oleic acid were provided first at 80° C. in a glass baker and mixed with a stirrer. 23.98 parts of B were added and molten whereat the temperature was maintained at 80° C. After this 28.15 parts of A was added to the mixture at 80° C. under stirring and the components A and B form a melt. 5.80 parts of component D (silicon oil) was added and mixed with a stirrer. Finally 1.29 parts of caustic soda (with solid content of 30% by weight) was added and mixed by stirring. The aqueous composition was mixed with a rotor-stator-mixer with a tip speed of 21 m/s for 5 minutes. Finally 21.05 parts of demineralized water were added and mixed with stirrer.

Total batch size: 400.0 g
Solid content by theory: 61.04% by weight
Solid content measured: 62.39% by weight A stable dispersion was achieved; the particles sizes were measured with the procedure described under Example IV. The average particle diameter $D_{50}$ was determined to 0.96 μm and $D_W$ to 0.98 μm.

e. Stabilizer Dispersion S4 (Inventive Example)

A stabilizer dispersion S4 comprising components A, B and C was prepared using a stirred tank equipped with by-pass pipe including a homogenization nozzle.

15.87 parts of demineralized water and 2.90 parts of oleic acid were provided first at 80° C. in 7 cbm (m³) vessel and mixed with a stirrer. 23.98 parts of B were added and molten whereat the temperature was maintained at 80° C. After this 28.16 parts of A were added to the mixture at 80° C. under stirring, whereat A and B form a melt. 5.80 parts of component D (silicon oil) were added and mixed with a stirrer. Finally 1.30 parts of caustic soda (with solid content of 32.0% by weight sodium hydroxide) were added and mixed by stirring. The mixture was then pumped through a by-bass pipe (loop pipe) and through a homogenization nozzle placed in the by-pass pipe for 4 hours with pressure drop over the nozzle from 11 to 15 bar. The homogenization nozzle is a perforated plate having eight slit like nozzles each with a dimension of 50 mm×2 mm. The throughput through the by-pass pipe is 35,000 kg/hour. During the homogenization step the temperature was maintained at 80° C.

Finally 21.99 parts of demineralized water were added and mixed with stirrer. All amounts given above in parts means parts per weight.

Total batch size: 6,003 kg
Solid content by theory: 61.1% by weight
Solid content, measured: 61.1% by weight A stable dispersion was achieved; the particles sizes were measured with the procedure described in Example IV. The average particle diameter $D_{50}$ was determined to 0.93 μm and the $D_W$ to 0.93 μm. The stabilizer dispersions S1 to S4 are summarized in the Table 1.

TABLE 1

Stabilizer dispersions S1 to S4 (all amounts given in % by weight unless indicated otherwise)

|  | S1 | S2 | S3 | S4 |
|---|---|---|---|---|
| A | 20.00 | 26.02 | 28.15 | 28.16 |
| B | 20.00 | 26.02 | 23.98 | 23.98 |
| C1 | 5.00 | 2.96 | — | — |
| C2 | — | — | 2.90 | 2.90 |
| D | — | — | 5.80 | 5.80 |
| E1 | — | — | 1.29 | 1.30 |
| Water | 55.00 | 45.00 | 37.88 | 37.86 |
| Solid content measured [%] | 46.17 | 54.67 | 62.39 | 61.10 |

Example II: Preparation of ABS Graft Copolymers CB

The following mixture of two ABS rubber latexes was used as graft copolymer CB:

2352.9 g of a first graft rubber latex with a solid content of 34.0% by weight obtained by emulsion polymerization of 50% by weight of a mixture of styrene and acrylonitrile in a ratio of 73:27 by weight onto 50% by weight of a polybutadiene latex (calculated as solids of the polybutadiene latex) with a $D_{50}$ size of 125 nm using potassium peroxodisulfate as initiator and tert-dodecylmercaptane as chain transfer agent and 3191.5 g of a second graft rubber latex with a solid content of 37.6% by weight obtained by emulsion polymerization of 41% by weight of a mixture of styrene and acrylonitrile in a ratio of 73:27 by weight onto 59% by weight of a polybutadiene latex (calculated as solids of the polybutadiene latex) with a $D_{50}$ size of 340 nm using potassium peroxodisulfate as initiator and tert-dodecylmercaptane as chain transfer agent The mixing ratio of the first graft rubber latex to the second graft rubber latex was 40:60 by weight based on the solids content.

The graft copolymer CB was mixed with each one of the stabilizer dispersions S1 to S4. The stabilizer dispersion was fed into the graft copolymer CB (which was an aqueous emulsion polymer) and stirred for 1 hour. Then the precipitation of the stabilized latex was performed by feeding this latex under stirring into a magnesium sulfate/sulfuric acid solution and heating up to 95° C. The final solid content of the precipitated dispersion was 12.5% by weight.

The amount of magnesium sulfate (100% by weight) and sulfuric acid (96% by weight) was used in such way that the concentration of magnesium sulfate was 0.5% by weight, based on the total aqueous phase (in the precipitation mixture) and the concentration of sulfuric acid (96% by weight) was 0.07% by weight, based on the total aqueous phase (in the precipitation mixture).

With specific values for the precipitation of the ABS graft copolymer CB1, the following amounts were used:

Demineralized water (10,981 g) was provided first then adding and solving of 55.23 g of magnesium sulfate (100% by weight) and 7.74 g of sulfuric acid (96% by weight). Afterwards the mixture of the graft rubber latexes and stabilizer dispersion S1 (32.49 g) was added under stirring and heating up to 95° C.

The ABS graft copolymers CB2 to CB4 were precipitated in the same manner; the amount of demineralized water which is provided first was adjusted slightly to achieve the same final solid content of the precipitated dispersion, which was in each case 12.5% by weight.

The mixture of graft copolymer CB and stabilizer dispersion was centrifuged, washed with water and dried to achieve residual humidity less than 1.0% by weight. An ABS graft rubber powder was obtained and used as graft copolymer CB in example Ill. The compositions of ABS graft copolymers are summarized in Table 2. The amounts, e.g. of stabilizers A and B, are calculated based on an corrected solid content, wherein a correction factor based on the measured solid content and the calculated solid content is used.

The thermal stability of said graft rubber powder was tested by a scorch test. A layer of about 1 cm of powder is stored in an oven at 180° C. The time in minutes was recorded when the colour of the powder change to dark brown.

The results are summarized in the following Table 2.

TABLE 2

Composition of the ABS graft copolymers CB1 to CB4

| | ABS graft copolymer CB | | | |
|---|---|---|---|---|
| | CB1 | CB2 | CB3 | CB4 |
| Stabilizer dispersion | S1 | S2 | S3 | S4 |
| Amount of stabilizer dispersion [g] | 32.49 | 27.44 | 28.76 | 29.35 |
| Amount of graft copolymer CB [g solids] | 2000 | 2000 | 2000 | 2000 |
| Amount of stabilizer dispersion in CB [% by weight, based on solids stabilizer per solids graft co-polymer] | 0.744 | 0.744 | 0.889 | 0.889 |
| A in graft copolymer CB powder [% by weight] | 0.331 | 0.352 | 0.403 | 0.430 |
| B in graft copolymer CB powder [% by weight] | 0.331 | 0.352 | 0.343 | 0.343 |
| D in graft copolymer CB powder [% by weight] | 0 | 0 | 0.083 | 0.083 |
| Scroch test at 180° C. [min] | 285 | 270 | 467 | 497 |

Example III: Preparation and Characterization of Thermoplastic Moulding Compositions a. Styrene-Acrylonitrile Copolymer CA (SAN Copolymer)

A statistical copolymer from styrene (monomer CA1) and acrylonitrile (monomer CA2) with a ratio of polymerized styrene to acrylonitrile of 73:27 was produced by free radical solution polymerization. The SAN copolymer (copolymer CA) exhibited a melt flow rate (MVR) of 56 mL/10 min, determined at 220° C. and 10 kg load according to ISO 1133.

b. Compounding Thermoplastic Moulding Compositions

The thermoplastic moulding compositions were produced by compounding and pelletized the compositions with a twin screw extruder ZSK25 at 240° C. and 660 rpm. The following components were used:

Copolymer CA: SAN copolymer prepared according to Example IIIa,

Graft copolymer CB: One of ABS graft rubber powders CB1 to CB4 according to Example II, Silicon oil D1: Polydimethylsiloxane with a kinematic viscosity of 30,000 mm²/s Further component E: E1 Ethylene bis(stearamide) (EBS) E2 Magnesium stearate The thermoplastic moulding compositions are described in the following Table 3.

TABLE 3

Thermoplastic moulding compositions (all amounts given in % by weight)

| | Thermoplastic Composition | | | |
|---|---|---|---|---|
| | TC1 | TC2 | TC3 | TC4 |
| ABS rubber powder (CB) | CB1 | CB2 | CB3 | CB4 |
| | 29.344 | 29.344 | 29.368 | 29.368 |
| SAN polymer (CA) | 68.527 | 68.527 | 68.527 | 68.527 |
| E1 | 1.958 | 1.958 | 1.958 | 1.958 |
| E2 | 0.147 | 0.147 | 0.147 | 0.147 |
| silicon oil D | 0.024 | 0.024 | 0 | 0 |

The melt volume rate MVR [mL/10 min] is measured on a polymer melt at 220° C. and 10 kg load according to ISO 1133.

The thermoplastic moulding compositions described above were processed to ISO test bars (80×10×4 mm) by injection moulding at a mass temperature of 240° C. and a mould temperature of 70° C. The following tests were performed using these test bars:

notched Izod impact strength [kJ/m²] according to ISO 180-1A at 23° C.,

Vicat softening temperatures B/120 (50N, 120° C./h) according to ISO 306.

The test results are summarized in the following Table 4.

TABLE 4

Properties of thermoplastic moulding composition

| | Thermoplastic Composition | | | |
|---|---|---|---|---|
| | TC1 | TC2 | TC3 | TC4 |
| MVR [mL/10 min] | 23.8 | 26.1 | 27.8 | 32.1 |
| Notched Izod impact strength [kJ/m²] | 16.1 | 15.5 | 12.7 | 18.7 |
| Vicat B/120 [° C.] | 95.6 | 96.2 | 97.4 | 101.0 |

The results of tables 2 and 4 clearly demonstrate the advantageous technical properties of the stabilizer dispersions and the thermoplastic mouldings prepared in accordance with the inventive processes in comparison to the state of the art.

The ABS graft copolymers CB comprising the stabilizer dispersion S3 and S4 show improved heat stability in comparison to the comparative examples CB1/S1 and CB2/S2 (table 2).

The thermoplastic moulding compositions which were prepared according to the inventive process and with a stabilizer dispersion produced in accordance with the inventive process (examples TC3 and TC4) showed good impact strength and a good ratio of melt flow. Further these compositions showed improved thermal stability, i.e. higher Vicat temperature, in comparison to the comparative examples TC1 and TC2.

Additionally, it can be stated that the thermoplastic composition TC4 comprising a stabilizer dispersion S, which is produced by homogenization via a homogenization nozzle (TC4), shows further improved heat stability, impact strength and melt flowability in comparison to the examples using a homogenization device based on a rotor/stator principle. Thus, the homogenization in a stirred tank with homogenization via by-pass pipe is the most preferred homogenization method.

Example IV: Particles Size Measurement

The particle size distribution and in particular the weight mean average particle diameter $D_W$ were determined by a measurement with an ultracentrifuge (see W. Scholtan, H. Lange: Kolloid Z. u. Z. Polymere 250, pp. 782 to 796 (1972)) or a disc centrifuge. The definition of the weight mean average particle size diameter $D_W$ is given by:

$$D_W = \mathrm{sum}(n_i * D_i^4) / \mathrm{sum}(n_i * D_i^3)$$

$n_i$: number of particles with the diameter $D_i$ (G. Lagaly, O. Schulz, R. Ziemehl: Dispersionen und Emulsionen: Eine Einführung in die Kolloidik feinverteilter Stoffe einschließlich der Tonminerale, Darmstadt: Steinkopf-Verlag 1997, ISBN 3-7985-1087-3, page 282, formula 8.3b).

The summation is normally performed from the smallest to largest diameter of the particles size distribution. It should be mentioned that for a particles size distribution of particles with the same density the volume mean average particle size diameter $D_v$ is equal to the weight mean average particle size diameter $D_W$.

The weight median particle size $D_{50}$ is the diameter which divides the population exactly into two equal parts. 50% by wt. of the particles are larger than the weight median particle size $D_{50}$ and 50% by wt. are smaller.

In particular the weight average particle size $D_W$ and $D_{50}$ of the stabilizer dispersion were measured with a disc centrifuge DC 24000 by CPS Instruments Inc. equipped with a low density disc at a rotational speed of the disc of 24,000 rpm. A polybutadiene latex with a narrow distribution and a mean particle size of 405 nm was used for calibration. An aqueous sugar solution of 17.1 mL with a density gradient of 8 to 20% by weight of saccharose was used, in order to achieve a stable flotation behaviour of the particles. The measurements were carried out at a rotational speed of the disc of 24,000 rpm by injecting 0.1 mL of a diluted dispersion prepared in an aqueous saccharose solution (24% by weight), containing about 0.2-2% by weight of rubber particles, into the disc containing the aqueous sugar solution with a density gradient of 8 to 20% by weight of saccharose.

For stabilizer emulsions containing Wingstay® L as phenolic stabilizer A and didodecyl-3,3'-dithiopropionate (Irganox® PS 800) as thio co-stabilizer B, the density of particles was determined to 1.016 g/ccm and the refractive index to 1.516.

For stabilizer emulsions containing Wingstay® L as phenolic stabilizer A, didodecyl-3,3'-dithiopropionate (Irganox® PS 800) as thio co-stabilizer B and silicon oil component D the density of particles was determined to 1.012 g/cm³ and the refractive index to 1.504.

The invention claimed is:

1. A process for producing a stabilizer dispersion S comprising:
    a) at least one phenolic stabilizer A;
    b) at least one thio co-stabilizer B;
    c) at least one surfactant C;
    d) at least one silicon oil component D;
    e) optionally, at least one further component E; and
    f) an aqueous phase P comprising at least 80% by weight, based on the total aqueous phase P, water,
    wherein the process comprises the following steps:
    i) providing an aqueous composition comprising an aqueous phase P;
    ii) adding at least one thio co-stabilizer B to the aqueous composition obtained in step i), wherein the temperature of the aqueous composition is higher than or equal to the melting point of the at least one thio co-stabilizer B;
    iii) adding at least one phenolic stabilizer A to the aqueous composition obtained in step ii), wherein the temperature of the aqueous composition is higher than or equal to the melting point of the at least one thio co-stabilizer B;
    iv) adding at least one surfactant C;
    v) adding at least one silicon oil component D and optionally at least one further component E; and
    vi) homogenization of the aqueous composition obtained in steps i) to v) wherein the aqueous composition is passed at least once through at least one homogenization device, wherein a stabilizer dispersion S, consisting of a continuous phase and at least one disperse phase, formed by particles of the disperse phase, is obtained, wherein the weight median particle size D50 of disperse phase particles of the stabilizer dispersion S obtained in step vi) is less than or equal to 3 µm.

2. The process according to claim 1, wherein the at least phenolic stabilizer A is selected from the group consisting of octadecyl 3-(3,5-bis(1,1-dimethylethyl)-4-hydroxyphenyl) propionate; a butylated reaction product of p-cresol and dicyclopentadiene according to formula (IId)

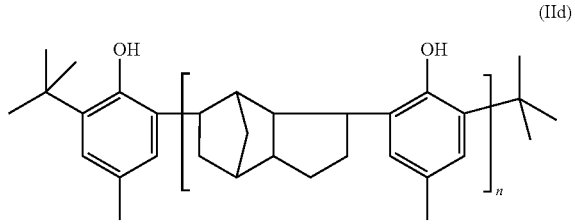

(IId)

with n=1-3; 1,1,3-tris(2'-methyl-4'-hydroxy-5'-tert-butylphenyl)butane; 2,2'-methylenebis(6-(1,1-dimethylethyl)-4-methyl-phenol); 4,4'-thiobis(3-methyl-6-tert-butylphenol); and compounds of the formula (I)

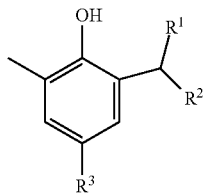 (I)

wherein R¹ is methyl or ethyl, R² is $C_2$-$C_{20}$-alkyl, and R³ is $C_1$-$C_4$-alkyl.

3. The process according to claim 1, wherein the at least one thio co-stabilizer B is a sulfide compound selected from the group consisting of dilauryl thiodipropionate, pentaerythritol tetrakis(octyl thiodipropionate), distearyl thiodipropionate, dimyristyl thiodipropionate, pentaerythritol tetrakis(β-lauryl thiodipropionate), 2,4-bis(n-octylthio)-6-(4'-hydroxy-3',5'-di-tert-butylanilino)-1,3,5-triazine, trimethylolpropane tris(octyl thiodipropionate), trimethylolethane tris(octyl thiodipropionate), ethylene glycol bis(lauryl thiodipropionate), and didodecyl monosulfide.

4. The process according to claim 1, wherein the surfactant C is selected from the group consisting of sodium and potassium salts of alkylsulfonates, arylalkylsulfonates, fatty acids, and salts of fatty acids.

5. The process according to claim 1, wherein the solid content of the aqueous composition obtained in obtained in steps i) to v) is in the range of 65 to 90% by weight, based on the total aqueous composition.

6. The process according to claim 1, wherein the temperature of the aqueous composition in steps ii) and iii) is in the range of 50 to 100° C.

7. The process according to claim 1, wherein the process encompasses the steps
   i) and iv) providing an aqueous composition comprising the aqueous phase P and the at least one surfactant C selected from fatty acids; and
   v) adding the at least one silicon oil component D and as component E at least one alkaline compound.

8. The process according to claim 1, wherein the process is carried out in a stirred tank equipped with at least one by-pass, wherein the at least one by-pass includes one or more homogenization nozzle and wherein the homogenization in step vi) is carried out by piping the aqueous composition through the at least one by-pass.

9. The process according to claim 1, wherein the stabilizer dispersion S comprises:
   0.1 to 65% by weight, based on the total weight of the stabilizer dispersion S, of the at least one phenolic stabilizer A;
   0.1 to 65% by weight, based on the total weight of the stabilizer dispersion S, of the at least one thio co-stabilizer B;
   0.1 to 20% by weight, based on the total weight of the stabilizer dispersion S, of the at least one surfactant C;
   0.1 to 40% by weight, based on the total weight of the stabilizer dispersion S, of the silicon oil D; and
   an amount of the aqueous phase P to make the total weight of the stabilizer dispersion 100% by weight.

10. The process according to claim 1, wherein the stabilizer dispersion S comprises:
   0.1 to 65% by weight, based on the total weight of the stabilizer dispersion S, of the at least one phenolic stabilizer A;
   0.1 to 65% by weight, based on the total weight of the stabilizer dispersion S, of the at least one thio co-stabilizer B;
   0.1 to 20% by weight, based on the total weight of the stabilizer dispersion S, of the at least one surfactant C;
   0.1 to 40% by weight, based on the total weight of the stabilizer dispersion S, of the silicon oil D;
   0.01 to 30% by weight, based on the total weight of the stabilizer dispersion S, of at least one further component E; and
   an amount of the aqueous phase P to make the total weight of the stabilizer dispersion 100% by weight.

* * * * *